(12) United States Patent
Lim et al.

(10) Patent No.: US 12,363,712 B2
(45) Date of Patent: Jul. 15, 2025

(54) RADIO FREQUENCY REQUIREMENTS FOR V2X COMMUNICATION

(71) Applicant: LG ELECTRONICS INC., Seoul (KR)

(72) Inventors: Suhwan Lim, Seoul (KR); Jinyup Hwang, Seoul (KR); Yoonoh Yang, Seoul (KR); Sangwook Lee, Seoul (KR); Jongkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 285 days.

(21) Appl. No.: 17/797,092

(22) PCT Filed: Jan. 11, 2021

(86) PCT No.: PCT/KR2021/000305
§ 371 (c)(1),
(2) Date: Aug. 2, 2022

(87) PCT Pub. No.: WO2021/162245
PCT Pub. Date: Aug. 19, 2021

(65) Prior Publication Data
US 2023/0078809 A1    Mar. 16, 2023

(30) Foreign Application Priority Data
Feb. 12, 2020  (KR) ......... 10-2020-0016938

(51) Int. Cl.
*H04W 72/04* (2023.01)
*H04L 27/26* (2006.01)
*H04W 72/0453* (2023.01)
*H04W 72/20* (2023.01)

(52) U.S. Cl.
CPC ....... *H04W 72/20* (2023.01); *H04L 27/26025* (2021.01); *H04W 72/0453* (2013.01)

(58) Field of Classification Search
None
See application file for complete search history.

(56) References Cited

U.S. PATENT DOCUMENTS

2017/0054535 A1   2/2017   Lim et al.

OTHER PUBLICATIONS

3GPP TSG RAN WG4 #93 meeting, V2X RF considerations, R4-1915430, Reno, USA, Nov. 18-22, 2019 (Year: 2019).*

(Continued)

*Primary Examiner* — Kouroush Mohebbi
(74) *Attorney, Agent, or Firm* — BRYAN CAVE LEIGHTON PAISNER LLP

(57) ABSTRACT

One aspect of the present specification provides wireless communication device in a wireless communication system. The wireless communication device includes: at least one transceiver; at least one processor; and at least one computer memory operably connectable to the at least one processor and storing instructions that, based on being executed by the at least one processor, perform operations comprising: receiving, via the at least one transceiver, sidelink signal based on a NR operating band n38 or a NR operating band n47, and wherein predefined reference sensitivity value, which is based on the NR operating band n38 or the NR operating band n47, is applied to the at least one transceiver.

11 Claims, 22 Drawing Sheets

(56) References Cited

OTHER PUBLICATIONS

3GPP, User Equipment (UE) conformance specification; Applicability of radio transmission, radio reception and radio resource management test cases, (3GPP TS 38.522 version 15.3.0, Release 15), ETSI TS 38.522 V15.3.0 (Jul. 2019).
"Consideration on candidate RF architecture for 5G V2X UE", LG Electronics, 3GPP TSG RAN WG4 #93 meeting, Reno, Nevada, U.S., Nov. 18-22 2019, R4-1913952.
"TP on 5G V2X UE RF requirements for con-current operations", LG Electronics, 3GPP TSG RAN WG4 #93 meeting, Reno, Neveda, U.S., Nov. 18-22, 2019, R4-1913953.
5G; NR; User Equipment (UE) conformance specification; Radio transmission and reception; Part 1: Range 1 standalone (3GPP TS 38.521-1 version 15.3.0 Release 15), ETSI TS 138 521-1 V15.3.0 (Jul. 2019).
"V2X RF considerations", Qualcomm Incorporated, 3GPP TSG-RAN4 #93, Reno, USA, Nov. 18-22, 2019, R4-1915430.
Vodafone, "NR V2X Operating Scenarios", 3GPP TSG-RAN WG4 Meeting #93, Reno, Nevada, US, Nov. 18-22, 2019, R4-1915419.
3GPP, Technical Specification Group Radio Access Network; NR; User Equipment (UE) conformance specification; Radio transmission and reception; Part 2: Range 2 Standalone (Release 15), 3GPP TS 38.521-2 v15.3.0 (Jun. 2019).

\* cited by examiner

RADIO FREQUENCY REQUIREMENTS FOR V2X COMMUNICATION

CROSS-REFERENCE TO RELATED APPLICATIONS

This application is the National Stage filing under 35 U.S.C. 371 of International Application No. PCT/KR2021/000305, filed on Jan. 11, 2021, which claims the benefit of Korean Application No. 10-2020-0016938, filed on Feb. 12, 2020, the contents of which are all hereby incorporated by reference herein in their entirety.

TECHNICAL FIELD

The present specification relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) has been studied and researched.

In NR, Vehicle to Everything (V2X) communication is defined. However, radio frequency (RF) requirements for NR V2X UE have not been clearly defined. For example, Rx requirements such as reference sensitivity for NR V2X UE or maximum input level for NR V2X UE are not defined. RF requirements for NR V2X UE is needed to be defined.

SUMMARY

Accordingly, a disclosure of the present specification has been made in an effort to solve the aforementioned problem.

Accordingly, a disclosure of the present specification has been made in an effort to solve the aforementioned problem.

In accordance with an embodiment of the present specification, a disclosure of the resent specification provides a wireless communication device in a wireless communication system. The wireless communication device includes: at least one transceiver; at least one processor; and at least one computer memory operably connectable to the at least one processor and storing instructions that, based on being executed by the at least one processor, perform operations comprising: receiving, via the at least one transceiver, sidelink signal based on a NR operating band n38 or a NR operating band n47, and wherein predefined reference sensitivity value, which is based on the NR operating band n38 or the NR operating band n47, is applied to the at least one transceiver.

In accordance with an embodiment of the present specification, a disclosure of the resent specification provides a method for performing V2X communication, the method performed by a UE. The method includes: receiving, via the at least one transceiver, sidelink signal based on a NR operating band n38 or a NR operating band n47, and wherein predefined reference sensitivity value, which is based on the NR operating band n38 or the NR operating band n47, is applied to the at least one transceiver.

In accordance with an embodiment of the present specification, a disclosure of the resent specification provides an apparatus in a mobile communication. The apparatus includes: at least one processor; and at least one memory that stores instructions and is operably electrically connectable to the at least one processor, wherein operation performed based on the instructions being executed by the at least one processor includes: receiving sidelink signal based on a NR operating band n38 or a NR operating band n47, and wherein predefined reference sensitivity value, which is based on the NR operating band n38 or the NR operating band n47, is applied to the at least one transceiver.

In accordance with an embodiment of the present specification, a disclosure of the resent specification provides a non-volatile computer readable storage medium storing instructions that, based on being executed by at least one processor, perform operations comprising: receiving sidelink signal based on a NR operating band n38 or a NR operating band n47, and wherein predefined reference sensitivity value, which is based on the NR operating band n38 or the NR operating band n47, is applied to a transceiver of a device including the non-volatile computer readable storage medium.

According to a disclosure of the present specification, the above problem of the related art is solved.

DESCRIPTION OF EXEMPLARY EMBODIMENTS

Figure 1:
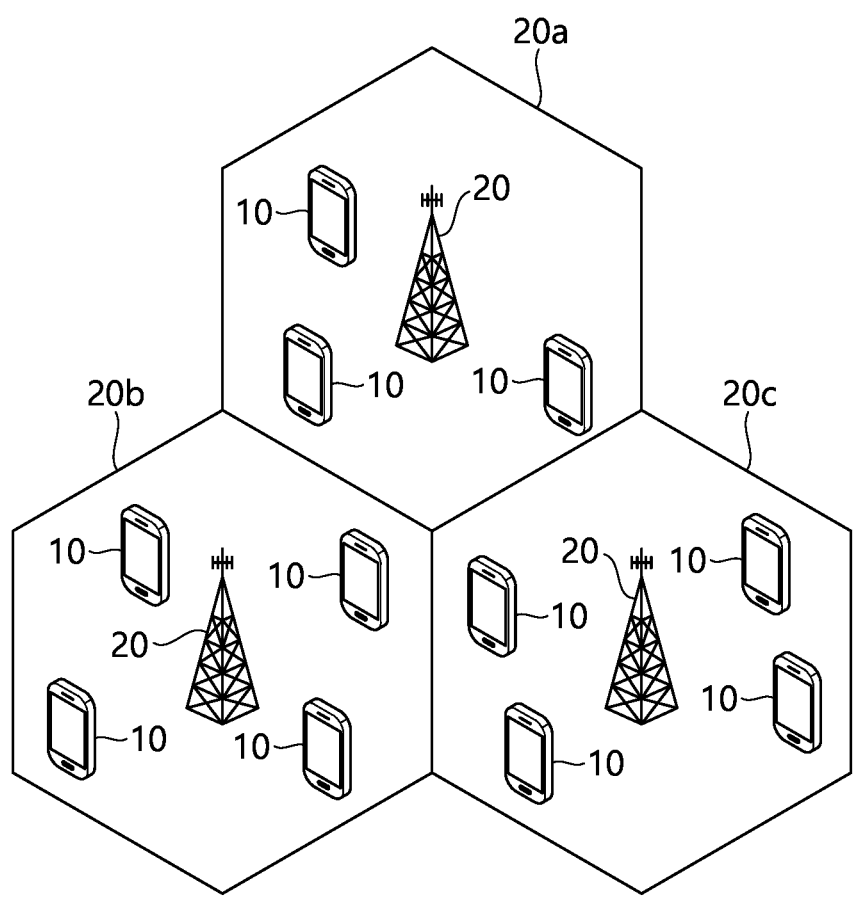
FIG. 1 is an example of a wireless communication system.

Hereinafter, based on 3rd Generation Partnership Project (3GPP) long term evolution (LTE), 3GPP LTE-advanced (LTE-A) or 3GPP fifth-generation (so called 5G) mobile communication (a new radio access technology (New RAT or NR)), the present specification will be applied. This is just an example, and the present specification may be applied to various wireless communication systems. Hereinafter, LTE includes LTE and/or LTE-A.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDCCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

Implementations of the present disclosure may be applied to various types of wireless communication systems, such as the 3rd Generation Partnership Project (3GPP) long term evolution (LTE), 3GPP LTE-advanced (LTE-A), 3GPP 5G (5th generation) or 3GPP New Radio (NR). These are just some examples, and implementations of the present disclosure may be applied to various other types of wireless communication systems. Hereinafter, LTE includes LTE and/or LTE-A.

In the appended drawings, although a User Equipment (UE) is illustrated as an example, this is merely an example given to simplify the description of the present disclosure. Herein, a UE may be a wireless communication device performing communication in a communication system such as EPS and/or 5GS, and so on. The UE shown in the drawings may also be referred to as a terminal, a mobile equipment (ME), a wireless communication device, a wireless communication apparatus, and so on. In some implementations, the UE may be implemented as a portable device, such as a laptop computer, a mobile phone, a PDA, a smart phone, a multimedia device, and so on. Alternatively, in some implementations, the UE may be implemented as a non-portable device, such as a personal computer (PC) or a vehicle mounted device.

Although the examples in the present disclosure are described based on a Universal Mobile Telecommunication System (UMTS), an Evolved Packet Core (EPC), and a next generation (also known as 5th generation or 5G) mobile communication network, implementations of the present disclosure are not limited to the aforementioned communication systems and may be applied to various other types of communication systems and techniques.

As used herein, 'base station' generally refers to a fixed station that communicates with a wireless device and may be denoted by other terms such as eNB (evolved-NodeB), gNB (next generation NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 is an example of a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to as a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Figure 2A:
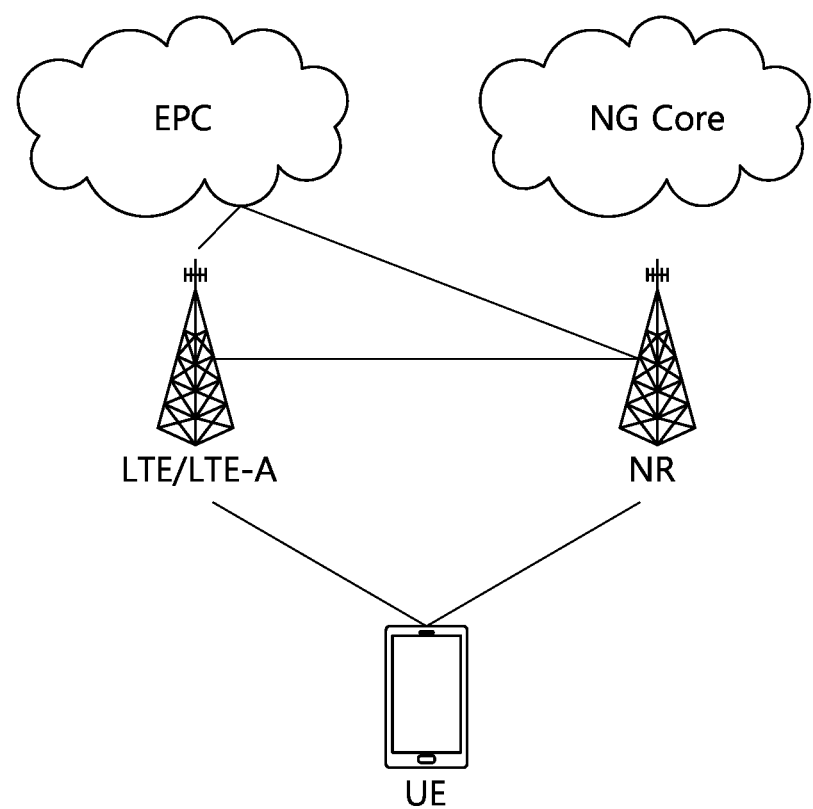
FIGS. 2a to 2c are exemplary diagrams illustrating exemplary architectures for services of the next generation mobile communication.
Figure 2B:
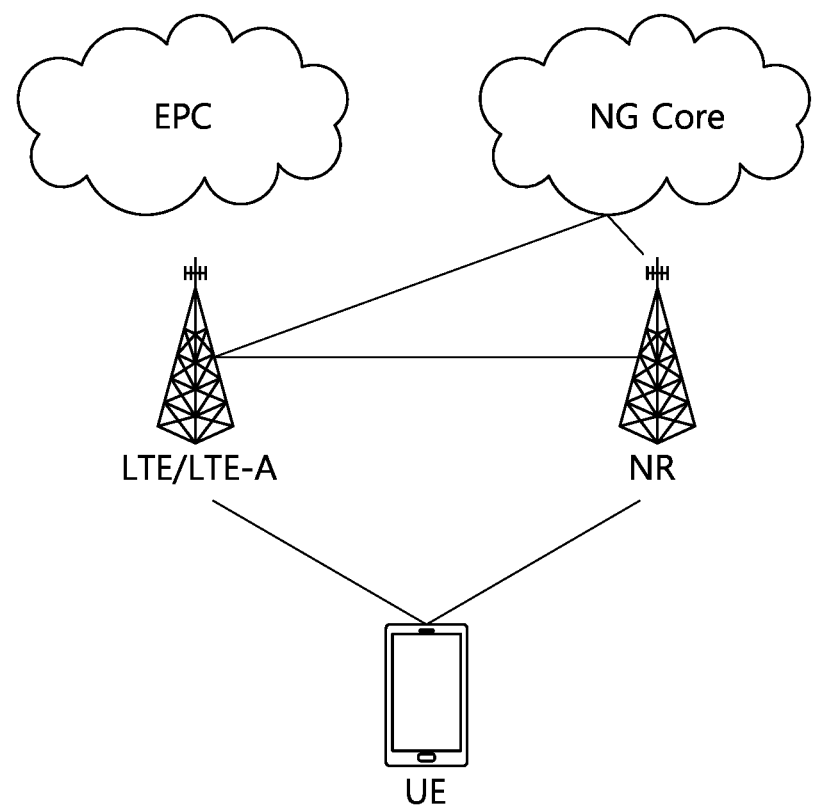
Figure 2C:
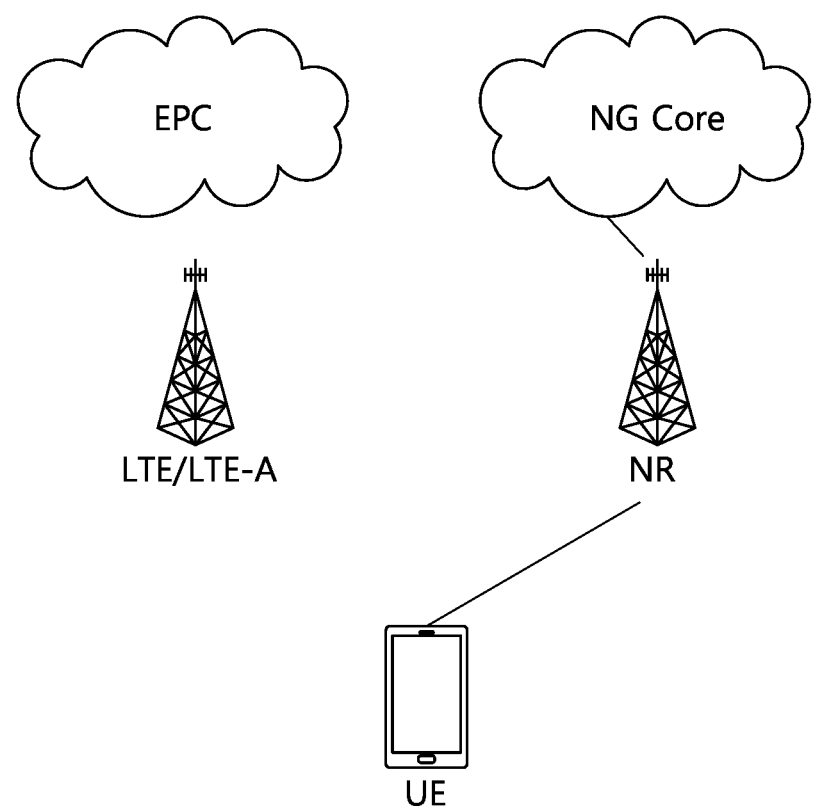

FIGS. 2a to 2c are exemplary diagrams illustrating exemplary architectures for services of the next generation mobile communication.

Referring to FIG. 2a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 2b, unlike FIG. 2a, the LTE/LTE-A based cell is connected to a core network for the 5G mobile communication, that is, a next generation (NG) core network.

The service scheme based on the architecture as illustrated in FIGS. 2a and 2b is called non-standalone (NSA).

Referring to FIG. 2c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

Figure 3:
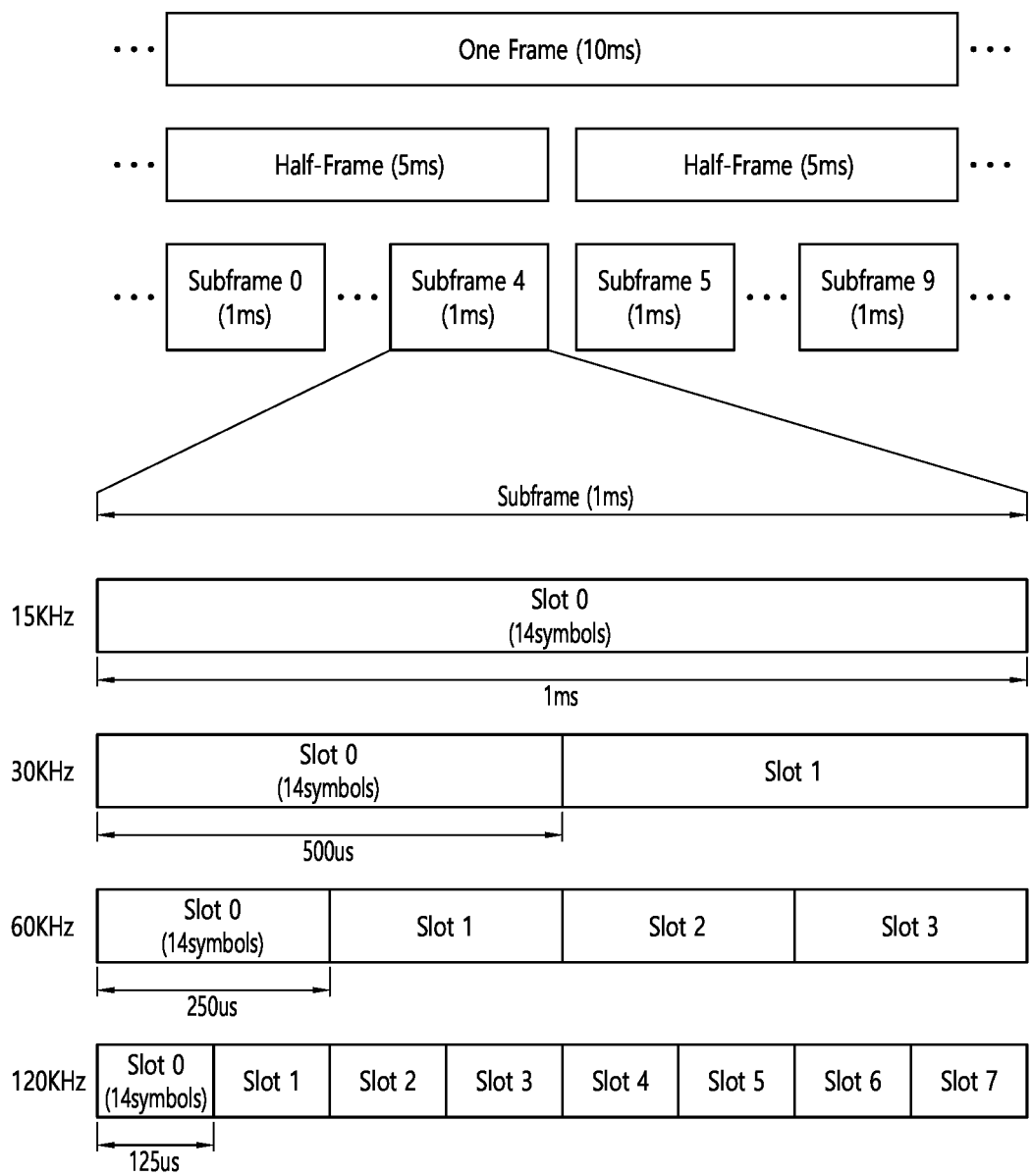
FIG. 3 illustrates an example of a structure of NR radio frame.

FIG. 3 illustrates an example of a structure of NR radio frame.

In the NR, the uplink and downlink transmission are based on radio frames. The radio frame has a length of 10 ms and may be defined as two 5 ms half-frames (HFs). The half-frame may be defined as five 1 ms subframes (SFs). The subframe is divided into one or more slots, and the number of slots in the subframe depends on the subcarrier spacing (SCS). Each slot includes 12 or 14 OFDM (A) symbols according to the cyclic prefix (CP). When the normal CP is used, each slot includes 14 symbols. When the extended CP is used, each slot includes 12 symbols. Here, the symbol may include an OFDM symbol (or CP-OFDM symbol) and an SC-FDMA symbol (or DFT-s-OFDM symbol).

Figure 4:
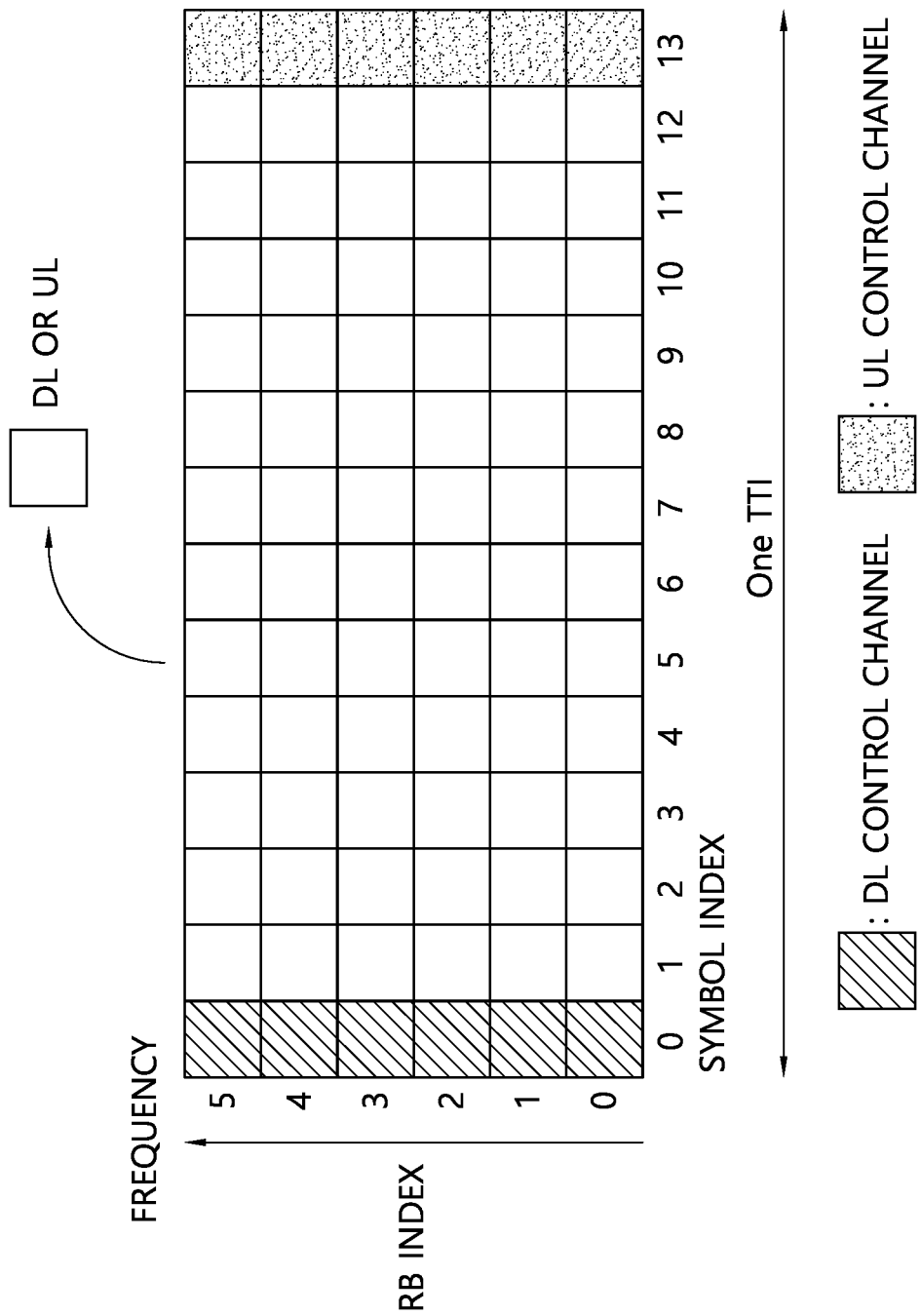
FIG. 4 shows an example of subframe type in NR.

FIG. 4 shows an example of subframe type in NR.

A transmission time interval (TTI) shown in FIG. 4 may be called a subframe or slot for NR (or new RAT). The subframe (or slot) in FIG. 4 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerologies>

The NR supports a plurality of numerologies (e.g. a plurality of values of subcarrier spacing (SCS)) in order to support various 5G services. For example, when the SCS is 15 kHz, a wide area in traditional cellular bands is supported. When the SCS is 30 kHz/60 kHz, a dense-urban, lower-latency, and wider carrier bandwidth is supported.

When the SCS is 60 kHz or greater, a bandwidth greater than 24.25 GHz is supported in order to overcome phase noise.

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by $\mu$, a subcarrier spacing and a corresponding CP length may be expressed as shown in the following table.

Table 1 exemplarily shows that when the normal CP is used, the number of symbols per slot, the number of slots per frame, and the number of slots per subframe vary according to the SCS.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: The number of symbols in slot
*$N^{frame,u}_{slot}$: The number of slots in frame
*$N^{subframe,u}_{slot}$: The number of slots in subframe Table 2 exemplarily shows that when the extended CP is used, the number of symbols per slot, the number of slots per frame, and the number of slots per subframe vary according to the SCS.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, OFDM (A) numerology (for example, SCS, CP length, and the like) may be set differently between a plurality of cells merged into one terminal. Accordingly, a (absolute time) section of a time resource (for example, SF, slot, or TTI) (commonly referred to as a time unit (TU) for convenience) composed of the same number of symbols may be set differently between the merged cells. Meanwhile, in the next-generation mobile communication, each symbol may be used for downlink or uplink, as shown in an example of the following table. In the following table, uplink is indicated by U, and downlink is indicated by D. In the following table, X indicates a symbol that can be flexibly used for uplink or downlink.

TABLE 3

| Format | \multicolumn{14}{c}{Symbol Number in Slot} |
|---|---|---|---|---|---|---|---|---|---|---|---|---|---|---|

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | U | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | U | U | U |
| 26 | D | D | X | X | X | X | X | X | X | X | X | U | U | U |
| 27 | D | D | D | X | X | X | X | X | X | X | U | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |

TABLE 3-continued

| Format | \multicolumn{14}{c}{Symbol Number in Slot} |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | D | X | X | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | X | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | U | D | X | X | X | X | X | X | U |
| 61 | D | D | X | X | X | X | U | D | D | X | X | X | X | U |

An NR frequency band may be defined as two types (FR1 and FR2) of frequency ranges. The frequency ranges may be changed. For example, the two types (FR1 and FR2) of frequency bands are illustrated in Table 1. For the convenience of description, among the frequency bands used in the NR system, FR1 may refer to a "sub-6-GHz range", FR2 may refer to an "above-6-GHz range" and may be referred to as a millimeter wave (mmWave).

TABLE 4

| Frequency Range Designation | Corresponding Frequency Range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the frequency ranges for the NR system may be changed. For example, FR1 may include a range from 410 MHz to 7125 MHz as illustrated in Table 5. That is, FR1 may include a frequency band of 6 GHz or greater (or 5850, 5900, 5925 MHz, or the like). For example, the frequency band of 6 GHz or greater (or 5850, 5900, 5925 MHz or the like) included in FR1 may include an unlicensed band. The unlicensed band may be used for various uses, for example, for vehicular communication (e.g., autonomous driving).

TABLE 5

| Frequency Range Designation | Corresponding Frequency Range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Table 6 shows examples of operating bands on FR1. Operating bands shown in Table 6 is a reframing operating band that is transitioned from an operating band of LTE/LTE-A. This operating band may be referred to as FR1 operating band.

TABLE 6

| NR operating band | Uplink (UL) operating band $F_{UL\_low}$-$F_{UL\_high}$ | Downlink (DL) operating band $F_{DL\_low}$-$F_{DL\_high}$ | Duplex mode |
| --- | --- | --- | --- |
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | supplemental uplink (SDL) |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | supplemental uplink (SUL) |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

Table 7 shows examples of operating bands on FR2. The following table shows operating bands defined on a high frequency. This operating band is referred to as FR2 operating band.

TABLE 7

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-283500 MHz | 27500 MHz-283500 MHz | TDD |

In NR, E-UTRA (Evolved UMTS(Universal Mobile Telecommunications System) Terrestrial Radio Access) operating bands may also be used for communication. E-UTRA operating bands may mean operating bands of LTE.

The following table is an example of E-UTRA operating bands.

TABLE 8

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD |
| 46 | 5150 MHz-5925 MHz | 5150 MHz-5925 MHz | TDD |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD |
| 50 | 1432 MHz-1517 MHz | 1432 MHz-1517 MHz | TDD |
| 51 | 1427 MHz-1432 MHz | 1427 MHz-1432 MHz | TDD |
| 64 | Reserved | | |
| 65 | 1920 MHz-2010 MHz | 2110 MHz-2200 MHz | FDD |
| 66 | 1710 MHz-1780 MHz | 2110 MHz-2200 MHz | FDD |
| 67 | N/A | 738 MHz-758 MHz | FDD |
| 68 | 698 MHz-728 MHz | 753 MHz-783 MHz | FDD |
| 69 | N/A | 2570 MHz-2620 MHz | FDD |
| 70 | 1695 MHz-1710 MHz | 1995 MHz-2020 MHz | FDD |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD |
| 76 | N/A | 1427 MHz-1432 MHz | FDD |
| 85 | 698 MHz-716 MHz | 728 MHz-746 MHz | FDD |

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<V2X(VEHICLE-TO-EVERYTHING) Communication>

V2X may collectively refer to communication technology between vehicles and all interfaces. The implementation form of V2X may be as follows.

First, in V2X, 'X' may be a vehicle. In this case, V2X may be expressed as V2V V2V (vehicle-to-vehicle) and V2X may mean communication between vehicles.

Figure 5:
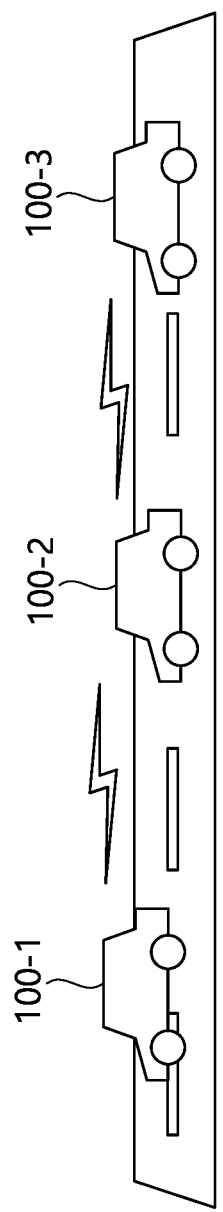
FIG. 5 is an exemplary view showing the concept of V2X.

FIG. 5 is an exemplary view showing the concept of V2X.

As can be seen with reference to FIG. 5, vehicles (i.e. wireless devices mounted on a vehicle) (100-1, 100-2, and 100-3) may communicate with each other.

Meanwhile, in V2X, 'X' may mean a person or a pedestrian. In this case, V2X may be expressed as V2P (vehicle-to-person or vehicle-to-pedestrian). Here, the pedestrian is not necessarily limited to a person who moves on foot, and may include a person riding a bicycle, a driver of a vehicle (which moves with a speed less than a certain speed), or a passenger.

Also, 'X' may be an infrastructure/network. In this case, V2X may be expressed as vehicle-to-infrastructure (V2I) or vehicle-to-network (V2N). V2X may mean communication between a vehicle and a roadside unit (ROADSIDE UNIT: RSU) or communication between a vehicle and a network. The roadside unit may be a device that informs a traffic related infrastructure, for example, a device informing a speed. The roadside unit may be implemented in a base station or a fixed terminal.

Hereinafter, V2X or SL(sidelink) communication will be described in detail.

Figure 6A:
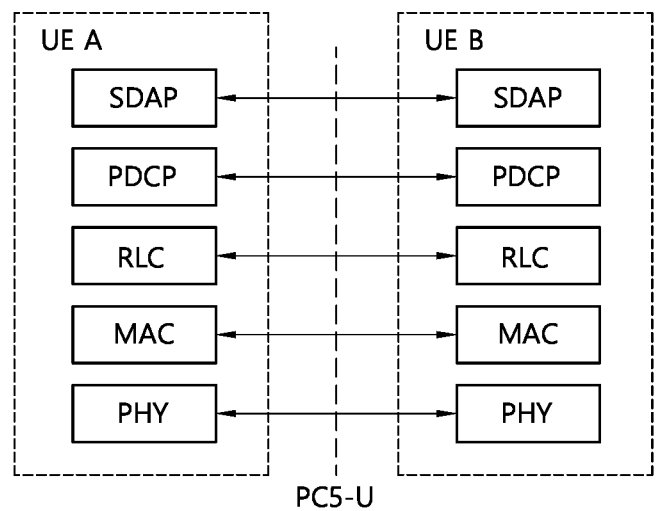
FIG. 6a and FIG. 6b illustrate a radio protocol architecture for SL communication according to an embodiment of the present disclosure.
Figure 6B:
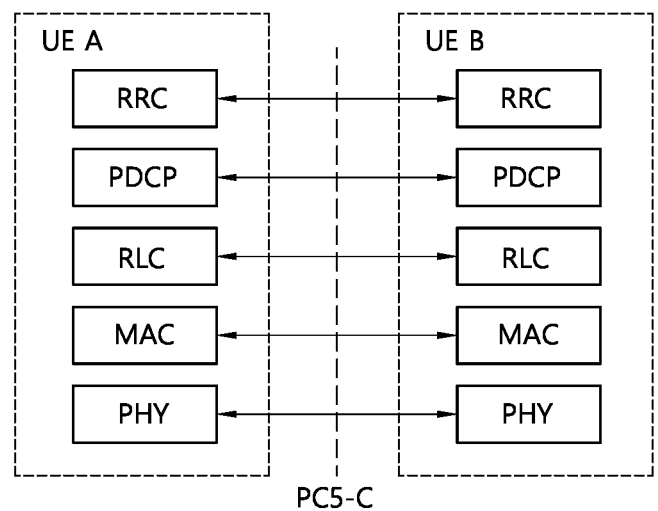

FIG. 6a and FIG. 6b illustrate a radio protocol architecture for SL communication according to an embodiment of the present disclosure.

The embodiments of FIGS. 6A and 6B may be combined with various embodiments of the present disclosure. Specifically, FIG. 6A shows a user plane protocol stack, and FIG. 6B shows a control plane protocol stack.

Hereinafter, an SL synchronization signal (Sidelink Synchronization Signal, SLSS) and synchronization information will be described.

SLSS is an SL-specific sequence, and may include a Primary Sidelink Synchronization Signal (PSSS) and a Secondary Sidelink Synchronization Signal (SSSS). The PSSS may be referred to as S-PSS (Sidelink Primary Synchronization Signal), and the SSSS may be referred to as S-SSS (Sidelink Secondary Synchronization Signal). For example, length-127 M-sequences may be used for S-PSS, and length-127 Gold sequences may be used for S-SSS. For example, a terminal may detect an initial signal using S-PSS and may acquire synchronization. For example, the terminal may acquire detailed synchronization using S-PSS and S-SSS, and may detect a synchronization signal ID.

The PSBCH (Physical Sidelink Broadcast Channel) may be a (broadcast) channel through which basic (system) information that the terminal needs to know first before transmitting and receiving SL signals is transmitted. For example, the basic information includes information related to SLSS, duplex mode (DM), TDD UL/DL (Time Division Duplex Uplink/Downlink) configuration, resource pool related information, and the type of application related to SLSS, a subframe offset, broadcast information, and the like. For example, for evaluation of PSBCH performance, in NR V2X, the payload size of the PSBCH may be 56 bits including a 24-bit CRC.

S-PSS, S-SSS, and PSBCH may be included in a block format that supports periodic transmission (e.g., SL SS (Synchronization Signal)/PSBCH block, hereinafter S-SSB (Sidelink-Synchronization Signal Block)). The S-SSB may have the same numerology (i.e., SCS and CP length) as the PSCCH (Physical Sidelink Control Channel)/PSSCH (Physical Sidelink Shared Channel) in a carrier, and the transmission bandwidth may be within (pre-) set SL BWP (Sidelink BWP). For example, the bandwidth of the S-SSB may be 11 Resource Block (RB). For example, the PSBCH can span 11 RBs. And, the frequency position of the S-SSB can be set (in advance). Therefore, the terminal does not need to perform hypothesis detection in frequency to discover the S-SSB in the carrier.

Figure 7:
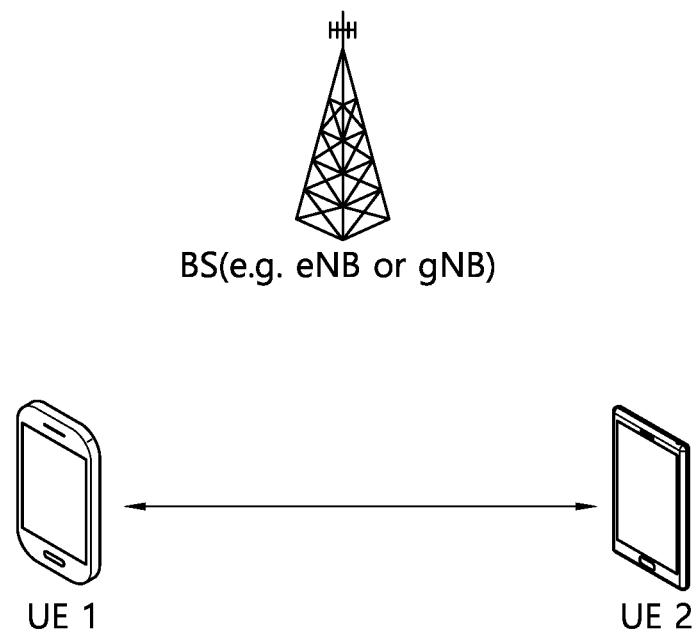
FIG. 7 shows a terminal performing V2X or SL communication according to an embodiment of the present disclosure.

FIG. 7 shows a terminal performing V2X or SL communication according to an embodiment of the present disclosure.

The embodiment of FIG. 7 may be combined with various embodiments of the present disclosure.

Referring to FIG. 7, in V2X or SL communication, the term terminal may mainly mean a terminal of a user. However, when network equipment such as a base station transmits and receives signals according to a communication method between terminals, the base station may also be regarded as a kind of terminal. For example, terminal 1 (UE 1) may be the first device 100, and terminal 2 (UE 2) may be the second device 200.

For example, terminal 1 may select a resource unit corresponding to a specific resource within a resource pool, which means a set of resources. In addition, UE 1 may transmit an SL signal using the resource unit. For example, terminal 2, which is a receiving terminal, may be configured with a resource pool through which terminal 1 can transmit a signal, and may detect a signal of terminal 1 in the resource pool.

Here, when the terminal 1 is within the connection range of the base station, the base station may inform the terminal 1 of the resource pool. On the other hand, if the terminal 1 is outside the connection range of the base station, another terminal may notify the resource pool to the terminal 1, or the terminal 1 may use a preset resource pool.

In general, the resource pool may be composed of a plurality of resource units, and each terminal may select one or a plurality of resource units and use it for transmitting its own SL signal.

<Disclosure of the Present Specification>

Currently, a 4Rx antenna must be supported in the refarming band(refer to an example in Table 6) of 3.5 GHz and 2.6 GHz and the new NR band. Standard related to radio frequency requirements has been discussed to obligatory support the 4Rx antenna not only in handheld terminals but also in vehicles supporting telematics service.

However, the antenna gain used in the automobile industry or the actual space or location that can be mounted on an actual vehicle have not been considered for the standard. For this, coverage issues caused by vehicle impact and link budget for the vehicle, T-put(throughput) degradation issues, and ways to distinguish between vehicle terminals and handheld terminals should be discussed. Here, T-put degradation issues may occur based on a difference between a handheld UE and a vehicle. For example, T-put loss may occur based on due to external interference and/or internal interference. In the case of the vehicle, since the cable loss term between baseband of the vehicle and RF receiver of the vehicle is larger than that of the handheld UE (e.g. smartphone), SNR is relatively lower than that of the handheld UE. Thus, for the vehicle, T-put loss may occur compared to the RF requirements defined for the handheld UE.

In the present specification, requirements(or standard) related to Rx and basic Tx/Rx core requirements(or standard) of a terminal to enable transmission and reception without harm to vehicle-to-vehicle communication are proposed, when a 5G NR V2X terminal performs a V2X operation using Sidelink communication in the ITS (Intelligent Transport Systems) operating frequency and the existing NR licensed band.

Currently, 3GPP is focusing on defining the RF standard (or requirements) for 5G V2X terminals. RF standards(or requirements) according to operating scenarios related to 5G V2X communication will be defined separately. Referring to examples written in Table 9 below, the V2X scenarios supported by rel-16(e.g. release 16 of 3GPP Technical Specification) are listed by priority, and the corresponding RF standards(or requirements) will be sequentially defined considering this priority. Table 9 shows examples of operating scenarios for the 5G V2X communication.

TABLE 9

|  |  | NR/LTE Band (n47/B47) (PC5 V2X) | NR/LTE Licensed Band X (Uu V2X) |
|---|---|---|---|
| Inter-band Con-current operation | NR/LTE Band (n47/B47) (PC5 V2X) | N/A (Not Applicable) | Case A: NR n47 (PC5) + NR Band X(Uu) |
|  |  |  | Case A: NR n47 (PC5) + LTE Band X(Uu) |
|  |  |  | Case B: LTE Band 47 (PC5) + NR Band X(Uu) |
|  | NR Licensed band Y (PC5 V2X) | N/A in rel-16: NR Band Y(PC5) + NR n47 (PC5) | Case C: NR Band Y(PC5) + NR Band X(Uu) |
|  |  | N/A in rel-16: NR Band Y(PC5) + LTE B47 (PC5) | Case C: NR Band Y(PC5) + LTE Band X(Uu) |
| Intra-band Con-current operation | NR Band (n47) (PC5 V2X) | N/A in rel-16: NR n47 (PC5) + NR n47 (PC5) | N/A |
|  | NR Licensed band X (PC5 V2X) | N/A | Case E: NR Band X(PC5) + NR Band X(Uu) |
|  |  |  | Case E: NR Band X(PC5) + LTE Band X(Uu) |

Examples shown in Table 9 may mean con-current operation scenarios for NR V2X service. Here, con-current operation may mean NR V2X UE performs communication based on both Uu interface and PC5 interface. First row of Table 9 may show Carrier 1 (NR/LTE PC5), which means the carrier used for NR/LTE PC5 interface for V2X con-current operating UE. Second column may show Carrier 2 (NR or LTE in licensed band), which means the carrier 2 used for NR Uu interface or LTE Uu interface for V2X con-current operating UE.

For reference, the PC5 link(or interface) may be an interface between the UE and the UE. The Uu link(or interface) may be an interface between the UE and the base station. The UE may establish a PC5 link with another UE, and perform sidelink communication (e.g. V2X communication) with another UE through the established PC5 link.

In Table 9, intra-band con-current operation may mean NR V2X UE performs communication based on both Uu interface and PC5 interface in the same operating band. Inter-band con-current operation may mean NR V2X UE performs communication based on both Uu interface and PC5 interface in different operating bands.

NR/LTE Licensed Band X means licensed operating bands such as B3, or B8 etc.

The following priorities may be considered for V2X operating scenarios.

RF core requirements for the 5G V2X UE is considered as 1$^{st}$ priority.

The con-current operation between 5G NR V2X SL (sidelink) and other system can be treated as 2nd priority. And 2nd & 3rd priority are proposed as following for con-current operation.

1) 2nd priority in con-current operation includes case A and case C of Table 9:

Case A: NR V2X PC5 (at n47)+NR/LTE Uu (at licensed bands) on inter-band con-current operation. Case A includes i) NR V2X PC5 (at n47)+NR Uu(at licensed bands) and ii) NR V2X PC5 (at n47)+LTE Uu(at licensed bands)

Case C: NR V2X SL (at licensed band Y)+LTE/NR Uu (at licensed band X) on inter-band con-current operation. Case C includes i) NR V2X PC5 (at licensed band Y)+NR Uu(at licensed band X) and ii) NR V2X PC5 (at licensed band Y)+LTE Uu(at licensed band X).

2) 3rd Priority for con-current operation (without ITS spectrum) includes case B and E of Table 9:

Case B: NR V2X PC5 (at LTE Band 47)+NR Uu (at licensed bands).

Case E: NR V2X PC5 (at licensed band)+LTE/NR Uu (at licensed band) on intra-band combination. Case E includes i) NR V2X PC5 (at licensed band X)+LTE Uu (at licensed band X) and ii) NR V2X PC5 (at licensed band X)+NR Uu (at licensed band X).

Figure 8:
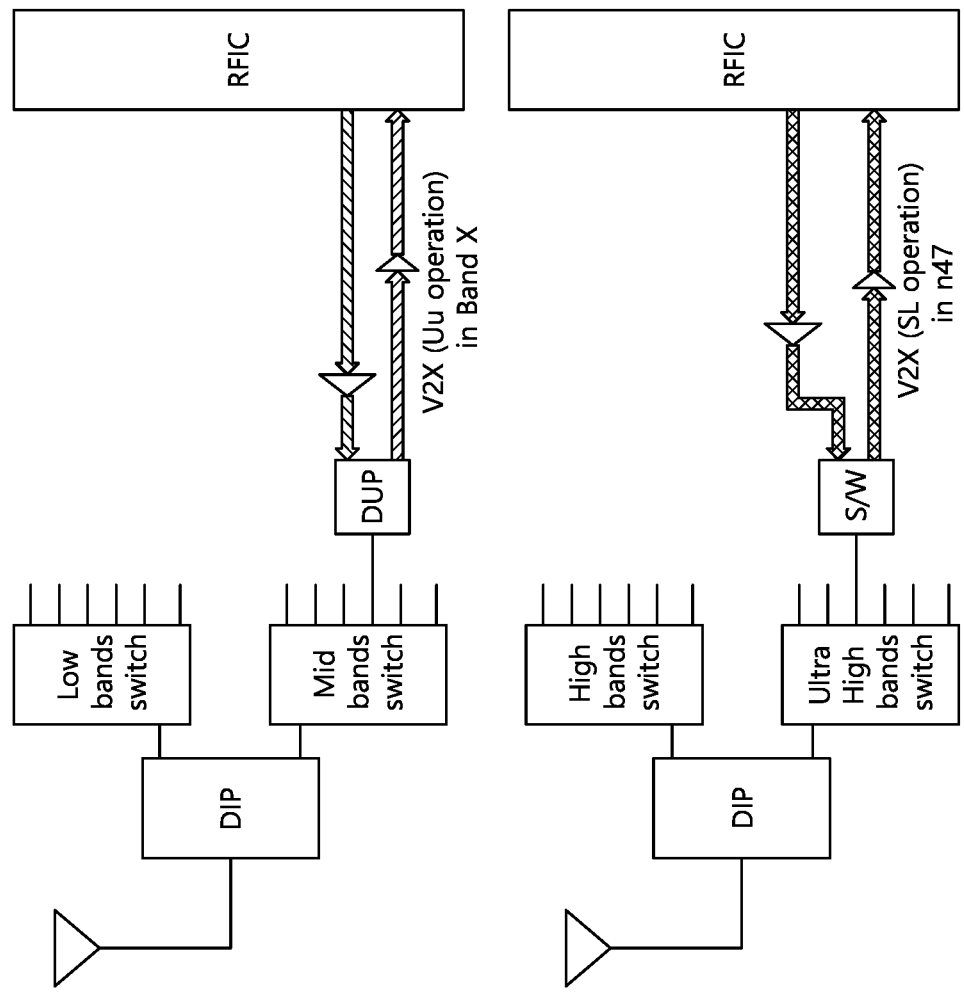
FIG. 8 shows an example of basic RF architecture for NR V2X UE according to an embodiment of the present specification.
Figure 9A:
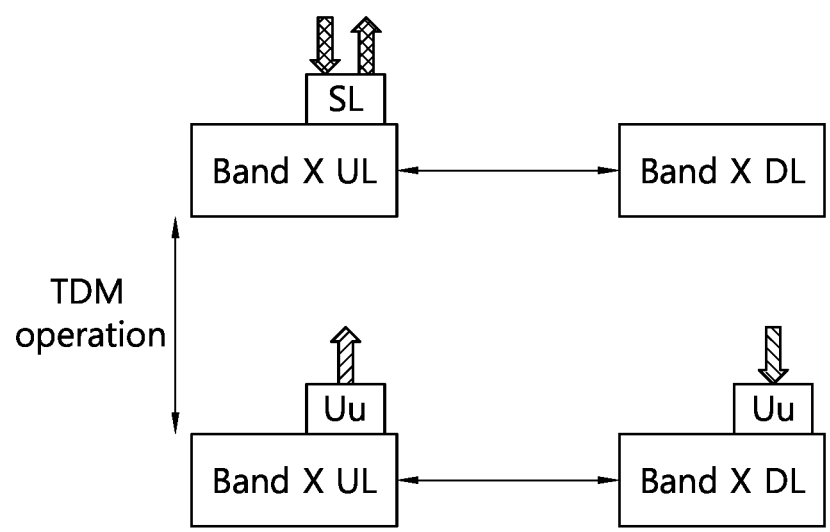
FIG. 9a and FIG. 9b shows another example of basic RF architecture for NR V2X UE according to an embodiment of the present specification.
Figure 9B:
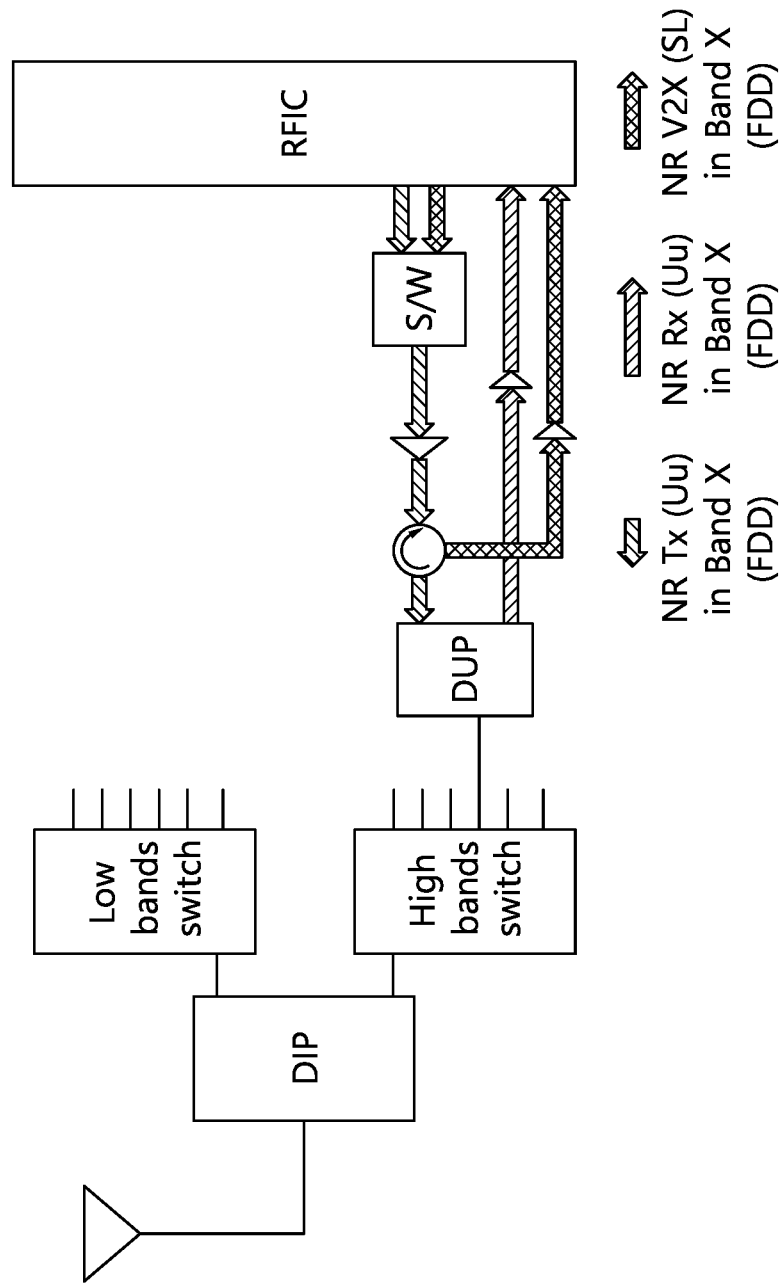

Referring to the following FIG. 8, FIG. 9a and FIG. 9b, examples of basic RF (Radio Frequency) architecture for NR V2X UE are proposed. These examples of basic RF architecture are for con-current operation. Following examples of basic RF architectures for NR V2X UE are considered for defining Rx requirements (or standard) (for example, reference sensitivity for NR V2X UE) and/or Tx requirements (or standard).

The following drawings are made to explain a specific example of the present specification. Since the names of specific devices or names of specific signals/messages/fields described in the drawings are provided by way of example, technical features of the present specification are not limited to specific names used in the following drawings.

FIG. 8 shows an example of basic RF architecture for NR V2X UE according to an embodiment of the present specification.

FIG. 8 shows an example of RF architecture for NR V2X UE. The example of RF architecture of FIG. 8 may used for NR V2X UE, which performs communication based on NR Uu (Band X) and NR SL (n47) operation.

In FIG. 8, DIP may mean diplexer. DUP may mean duplexer. S/W may mean switch. Triangular objects between DUP and RFIC in FIG. 8 is power amplifier. Triangular objects between S/W and RFIC in FIG. 8 is power amplifier. RFIC is Radio Frequency Integrated Chip. Triangular objects with lines connected to DIP of FIG. 8 are antennas.

According to example of basic RF architecture for NR V2X UE of FIG. 8, NR V2X UE performs Uu communication (communication based on Uu link (or interface)) based on operating band X. According to example of basic RF architecture for NR V2X UE of FIG. 8, NR V2X UE performs SL communication (communication based on sidelink (or PC5) link (or interface)) based on operating band n47.

The following drawings are made to explain a specific example of the present specification. Since the names of specific devices or names of specific signals/messages/fields described in the drawings are provided by way of example, technical features of the present specification are not limited to specific names used in the following drawings.

FIG. 9a and FIG. 9b shows another example of basic RF architecture for NR V2X UE according to an embodiment of the present specification.

FIG. 9a and FIG. 9b shows an example of RF architecture for NR V2X UE in a specific licensed operating band X. The example of RF architecture of FIG. 9a and FIG. 9b may used for NR V2X UE, which performs communication based on NR Uu (Band X) and NR SL (Band X) operation in operating band X. Here, Band X can be operated in the licensed operating band in Table 6 or Table 9.

In FIG. 9a and FIG. 9b, DIP may mean diplexer. DUP may mean duplexer. S/W may mean switch. Triangular objects between DUP and RFIC in FIG. 9a and FIG. 9b is power amplifier. Triangular objects between S/W and RFIC in FIG. 9a and FIG. 9b is power amplifier. RFIC is Radio Frequency Integrated Chip. Triangular objects with lines connected to DIP of FIG. 9a and FIG. 9b are antennas. Circular object is a RF component to change the RF path between SL transmission and SL reception operation in FDD band since sidelink share the UL band frequency for both SL transmission and SL reception in FDD band.

According to example of basic RF architecture for NR V2X UE of FIG. 9a and FIG. 9b, NR V2X UE performs Uu communication (communication based on Uu link (or interface)) based on operating band X. According to example of basic RF architecture for NR V2X UE of FIG. 9a and FIG. 9b, NR V2X UE performs SL communication (communication based on sidelink (or PC5) link (or interface)) based on operating band X. For example, according to FIG. 9a and FIG. 9b, NR V2X UE may perform SL communication and Uu communication based on TDM(Time Division Multiplexing) operation regardless of FDD or TDD licensed band. In FIG. 9b, NR V2X UE may perform SL communication based on Uplink band of operating band X FIG. 9, operating band X is FDD based operating band.

For various operation scenarios for NR V2X UE, RF requirements, such as REFSENS (reference sensitivity or reference sensitivity power level) are proposed. For example, REFSENS requirements of UE for single carrier operation in NR Band n47 (ITS (Intelligent transport systems) spectrum) may be proposed. For example, REFSENS requirements of UE for the inter-band con-current V2X operation may be proposed.

In detail, for the inter-band con-current V2X operation (NR Uu operation in licensed band and NR PC5 V2X operation in ITS spectrum (NR Band n47)), analysis for self defense problem may be considered for determining REFSENS requirements. For example, analyzing whether or not self defense problem from NR Uplink transmission fall into the own NR n47 frequency range (5855-5925 MHz) may be considered. The following FIG. 10 and FIG. 11 are examples of inter-band con-current V2X operation.

Figure 10:
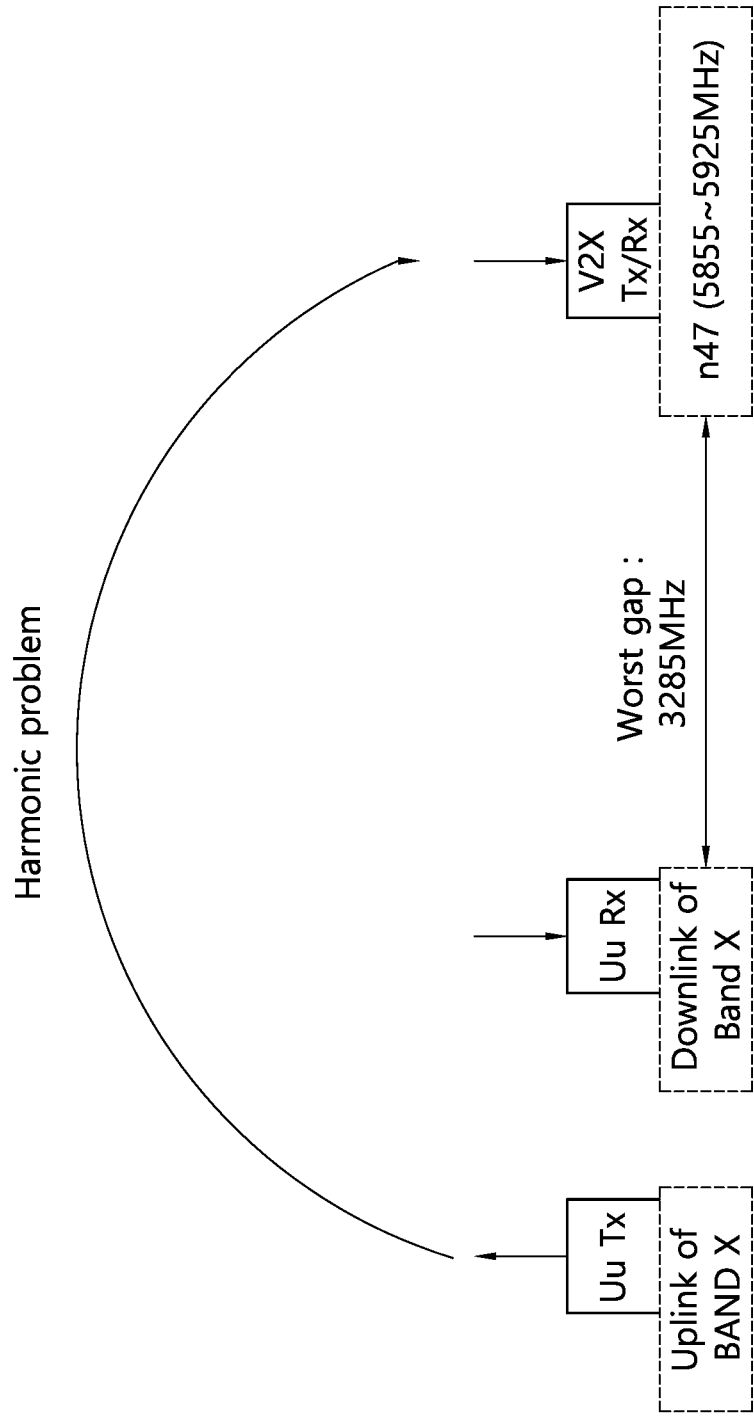
FIG. 10 shows a first example of con-current operation for NR V2X according to an embodiment of the present specification.
Figure 11:
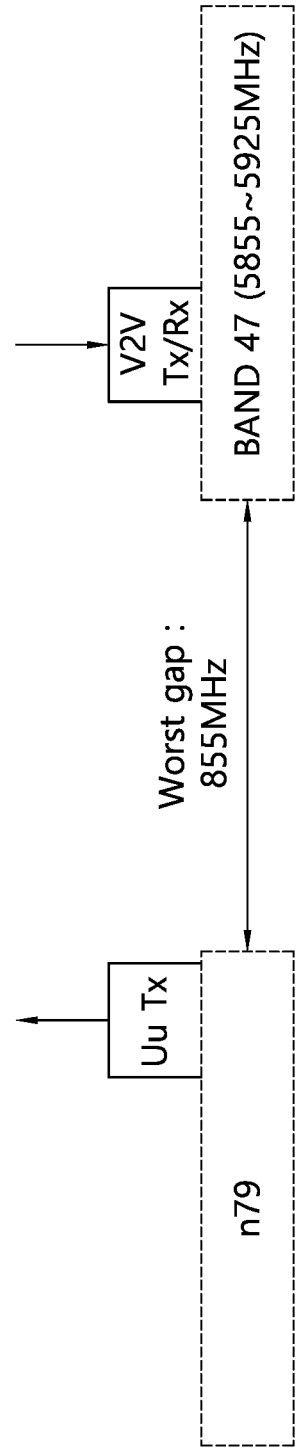
FIG. 11 shows a second example of con-current operation for NR V2X according to an embodiment of the present specification.

FIG. 10 and FIG. 11 shows examples of the following 2 cases of inter-band con-current operation on both licensed band(e.g. band X), and ITS spectrum (e. g. band n47). For example, FIG. 10 shows case A, which is related to TDD-FDD inter-band con-current operation (e.g. n7 band for Uu and n47 band for V2X). FIG. 11 shows case B, which is related to TDD-TDD inter-band con-current operation (e.g. n79 band for Uu and n47 band for V2X). Examples of FIG. 10 and FIG. 11 may be considered for defining REFSENS requirements for NR V2X service for inter-band con-current operation.

The following drawings are made to explain a specific example of the present specification. Since the names of specific devices or names of specific signals/messages/fields described in the drawings are provided by way of example, technical features of the present specification are not limited to specific names used in the following drawings.

FIG. 10 shows a first example of con-current operation for NR V2X according to an embodiment of the present specification.

FIG. 10 shows the first example of con-current operation for NR V2X. FIG. 10 shows case A, which is related to TDD-FDD inter-band con-current operation (e.g. n7 band for Uu and n47 band for V2X).

According to FIG. 10, UE may perform V2X communication in operating band n47, which has frequency range of 5855 MHz to 5925 MHZ. UE may perform Uu communication based on FDD in operating band X. Here, operating band X may be operating band n7.

Worst gap between operating band X and operating band n47 may be 3285 MHz. In case A shown in FIG. 10, the uplink transmission or x ordered harmonic product of licensed band can affect, as an interference, reception of the V2X signal in ITS spectrum. These test configurations may be applicable to TDD-FDD con-current V2X operation such as NR band n7+n47.

The following drawings are made to explain a specific example of the present specification. Since the names of specific devices or names of specific signals/messages/fields described in the drawings are provided by way of example, technical features of the present specification are not limited to specific names used in the following drawings.

FIG. 11 shows a second example of con-current operation for NR V2X according to an embodiment of the present specification.

FIG. 11 shows the second example of con-current operation for NR V2X. FIG. 11 shows case B, which is related to TDD-TDD inter-band con-current operation (e.g. n79 band for Uu and n47 band for V2X).

According to FIG. 11, UE may perform V2X communication in operating band n47, which has frequency range of 5855 MHz to 5925 MHZ. UE may perform Uu communication based on TDD in operating band X. Here, operating band X may be operating band n79.

Worst gap between operating band X and operating band n47 may be 855 MHz. In case B shown in FIG. 11, when UE performs simultaneous Tx/Rx communication based on adjacent two inter-bands, UE's own receiving signal based on band n47 can be interfered by the uplink transmission of licensed band.

Based on examples shown in FIG. 10 and FIG. 11, con-current operation may be carefully specified and uplink test configuration may be carefully decided.

For both Case A and Case B shown in FIG. 10 and FIG. 11, uplink configurations and REFSENS requirements for con-current NR V2X operation may be defined.

Hereinafter, reference sensitivity (REFSENS) requirements proposed in the disclosure of the present specification will be described.

Reference sensitivity for NR V2X will be described. The reference sensitivity power level (REFSENS) is the minimum mean power applied to each one of the UE antenna ports for all UE categories, at which the throughput shall meet or exceed the requirements for the specified reference measurement channel.

When UE is for NR V2X reception non-concurrent with NR uplink transmissions for NR V2X operating bands specified in Table 10, the throughput shall be ≥95% of the maximum throughput of the reference measurement channels with parameters specified in Table 11.

Table 10 shows an example of NR V2X operating bands in a single carrier with half duplex.

TABLE 10

| V2X Operating Band | Sidelink (SL) Transmission operating band $F_{UL\_low}$-$F_{UL\_high}$ | Sidelink (SL) Reception operating band $F_{DL\_low}$-$F_{DL\_high}$ | Duplex Mode | Interface |
|---|---|---|---|---|
| n38 | 2570 MHz-2620 MHz | 2570 MHz-2620 MHz | HD (Half Duplex) | PC5 |
| n47 | 5855 MHz-5925 MHz | 5855 MHz-5925 MHz | HD | PC5 |

When V2X operation band n38 is used for V2X SL service, the band may be exclusively used for NR V2X in particular regions. Table 11 shows an example of Reference sensitivity of NR V2X bands (PC5)

TABLE 11

| | | SCS/Channel bandwidth/Duplex Mode | | | | |
|---|---|---|---|---|---|---|
| NR V2X Band | SCS (kHz) | 10 MHz (dBm) | 20 MHz (dBm) | 30 MHz (dBm) | 40 MHz (dBm) | Duplex Mode |
| n38 | 15 | −96.7 | −93.5 | −91.7 | −90.6 | TDD |
| | 30 | −97.3 | −93.6 | −91.9 | −90.5 | |
| | 60 | −96.9 | −94.3 | −92.7 | −90.6 | |
| n47 | 15 | −92.7 | −89.5 | −87.7 | −86.6 | TDD |
| | 30 | −93.3 | −89.6 | −87.9 | −86.5 | |
| | 60 | −92.9 | −90.3 | −88.7 | −86.6 | |

A transceiver of NR V2X UE is configured to satisfy reference sensitivity value defined in the example shown in Table 11. The signal power written in Table 11 may be specified per antenna port. The example of reference sensitivity shown in Table 11 may be applied to a transceiver of NR V2X UE. For example, for operating band n38, with 60 kHz of SCS and 10 MHz of channel bandwidth the transceiver of NR V2X UE is configured to satisfy −96.9 dBm of reference sensitivity for receiving sidelink(or V2X) signal. For example, for operating band n47, with 60 kHz of SCS and 10 MHz of channel bandwidth the transceiver of NR V2X UE is configured to satisfy −92.9 dBm of reference sensitivity for receiving sidelink(or V2X) signal.

Table 12 shows an example of Sidelink TX configuration for reference sensitivity of NR V2X Bands (PC5)

TABLE 12

| | | SCS/Channel bandwidth/$N_{RB}$/Duplex mode | | | | |
|---|---|---|---|---|---|---|
| NR V2X Band | SCS (kHz) | 10 MHz (dBm) | 20 MHz (dBm) | 30 MHz (dBm) | 40 MHz (dBm) | Duplex Mode |
| n38 | 15 | 50 | 105 | 160 | 210 | TDD |
| | 30 | 20 | 50 | 75 | 105 | |
| | 60 | 10 | 20 | 30 | 50 | |
| n47 | 15 | 50 | 105 | 160 | 210 | TDD |
| | 30 | 20 | 50 | 75 | 105 | |
| | 60 | 10 | 20 | 30 | 50 | |

Table 12 shows the example of Sidelink TX configuration used for defining the reference sensitivity of NR V2X Bands (PC5). Table 12 shows number of Resource Blocks (RBs) ($N_{RB}$) based on combination of NR V2X operating band, SCS, Channel bandwidth and Duplex mode. When UE is configured for NR V2X reception on V2X carrier concurrent with NR uplink/downlink for inter-band NR V2X/NR bands specified in Table 13 with a carrier in V2X sidelink, NR V2X sidelink throughput for the component carrier shall be ≥95% of the maximum throughput of the reference measurement channels with parameters specified in Table 14. Also, the NR downlink throughput shall be ≥95% of the maximum throughput of the reference measurement channels.

Table 13 shows an example of NR V2X operating bands for concurrent operation.

TABLE 13

| V2X con-current operating Band | NR or V2X Operating Band | Interface |
|---|---|---|
| V2X_n71-n47 | n71 | Uu |
| | n47 | PC5 |

NR V2X operation may be designed to operate concurrent with NR uplink/downlink on the operating bands combination listed in the above Table 13. For the UE which supports NR V2X in an operating band as specified in Table 13, and the UE also supports a NR inter-band con-current configuration, the minimum requirement for reference sensitivity in Table 14 shall be increased by the amount given in $\Delta R_{IB,v2x}$ for the corresponding NR V2X band. $\Delta R_{IB,v2x}$ may be defined for each of V2X operating band n38 and n47. The $\Delta R_{IB,v2x}$ is considered when additional RF components are included in RF chain such as harmonic trap filter to reduce harmonic impact in own Rx band. Unless otherwise stated, $\Delta R_{IB,v2x}$ can be set to zero.

TABLE 14

| | | Inter-band V2X reception | | | | | |
|---|---|---|---|---|---|---|---|
| NR V2X Band (Uu) | NR V2X band (PC5) | V2X band | SCS/Channel bandwidth/Duplex Mode | | | | |
| | | | SCS (kHz) | 10 MHz (dBm) | 20 MHz (dBm) | 30 MHz (dBm) | 40 MHz (dBm) | Duplex Mode |
| NR Band X | NR Band n38 | nX | 15 | TBD | TBD | TBD | TBD | TDD or |
| | | | 30 | TBD | TBD | TBD | TBD | FDD |
| | | | 60 | TBD | TBD | TBD | TBD | |

TABLE 14-continued

| NR V2X Band (Uu) | NR V2X band (PC5) | V2X band | SCS (kHz) | 10 MHz (dBm) | 20 MHz (dBm) | 30 MHz (dBm) | 40 MHz (dBm) | Duplex Mode |
|---|---|---|---|---|---|---|---|---|
| | | n38 | 15 | [−96.7] | [−93.5] | [−91.7] | [−90.6] | TDD |
| | | | 30 | [−97.3] | [−93.6] | [−91.9] | [−90.5] | |
| | | | 60 | [−96.9] | [−94.3] | [−92.7] | [−90.6] | |
| NR Band X | NR Band n47 | nX | 15 | TBD | TBD | TBD | TBD | TDD or |
| | | | 30 | TBD | TBD | TBD | TBD | FDD |
| | | | 60 | TBD | TBD | TBD | TBD | |
| | | 47 | 15 | [−92.7] | [−89.5] | [−87.7] | [−86.6] | TDD |
| | | | 30 | [−93.3] | [−89.6] | [−87.9] | [−86.5] | |
| | | | 60 | [−92.9] | [−90.3] | [−88.7] | [−86.6] | |

A transceiver of NR V2X UE, which performs NR V2X reception on V2X carrier con-current with NR uplink/downlink, is configured to satisfy reference sensitivity value defined in the example shown in Table 14. TBD may mean To Be Determined. Reference sensitivity for operating band X is not defined yet. The signal power written in Table 14 may be specified per antenna port. "[ ]" of Table 14 may mean that reference sensitivity value, which is a value written in "[ ]", may be increased by the amount given in $\Delta R_{IB,v2x}$ for the corresponding NR V2X band.

The reference sensitivity of V2X SL is defined to be met with NR uplink assigned to one band and all NR downlink carriers active. The NR uplink resource blocks shall be located as close as possible to NR V2X operating band but confined within the transmission bandwidth configuration for the channel bandwidth (refer to an example written in Table 15). Examples of the uplink configuration for the NR operating band is specified in Table 16 and Table 17. The REFSENS of NR Uu downlink and PC5 sidelink may be tested at the same time.

Table 15 shows an example of Channel bandwidth for V2X concurrent operation.

Table 15 shows an example of Channel bandwidth for V2X concurrent operation.

TABLE 15

| V2X con-current operating band Configuration | NR Bands | SCS kHz | 5 MHz | 10 MHz | 15 MHz | 20 MHz | 30 MHz | 40 MHz | 50 MHz | Maximum bandwidth [MHz] | Bandwidth combination set |
|---|---|---|---|---|---|---|---|---|---|---|---|
| V2X_n71A-n47A | n71 | 15 | Yes | Yes | Yes | Yes | | | | 60 | 0 |
| | | 30 | | Yes | Yes | Yes | | | | | |
| | | 60 | | | | | | | | | |
| | n47 | 15 | | Yes | | Yes | Yes | Yes | | | |
| | | 30 | | Yes | | Yes | Yes | Yes | | | |
| | | 60 | | Yes | | Yes | Yes | Yes | | | |

For NR V2X inter-band con-current operation in FR1, the NR V2X channel bandwidths for each operating band may be specified as the example of Table 15. That is, Table 15 is an example of Inter-band con-current V2X configurations.

Table 16 shows an example of uplink configuration for REFSENS of NR V2X Band (PC5).

TABLE 16

| NR V2X band (PC5) | NR V2X band (Uu) | NR V2X UL band (Uu) | SCS (kHz) | Channel Bandwidth (MHz) | $N_{RB}$ | Duplex Mode |
|---|---|---|---|---|---|---|
| n38 | nX | nX | 15 | 10 | 52 | TDD or |
| | | | 30 | 10 | 24 | FDD |
| | | | 60 | 10 | 11 | |
| n47 | nX | nX | 15 | 10 | 52 | TDD or |
| | | | 30 | 10 | 24 | FDD |
| | | | 60 | 10 | 11 | |

In Table 16, nX may mean NR operating band X. Examples of the uplink configuration for the NR operating band is specified in Table 16 may be used for defining reference sensitivity.

Table 17 shows an example of Sidelink TX configuration for REFSENS of NR V2X Band (Uu).

TABLE 17

| Inter-band NR V2X/NR band configuration | | | SL Tx band/SCS/Channel BW/$N_{RB}$/Duplex mode | | | |
|---|---|---|---|---|---|---|
| NR V2X band (PC5) | NR V2X band (Uu) | NR V2X band (PC5) | SCS (kHz) | Channel Bandwidth (MHz) | $N_{RB}$ | Duplex Mode |
| n38 | nX | n38 | 15 | 10 | 50 | TDD |
|  |  |  | 30 | 10 | 20 |  |
|  |  |  | 60 | 10 | 10 |  |
| n47 | nX | n47 | 15 | 10 | 50 | TDD |
|  |  |  | 30 | 10 | 20 |  |
|  |  |  | 60 | 10 | 10 |  |

In Table 17, nX may mean NR operating band X. Examples of the Sidelink TX configuration for REFSENS of NR V2X Band (Uu) is specified in Table 17 may be used for defining reference sensitivity. Hereinafter, Maximum input level for NR V2X proposed in the disclosure of the present specification will be described.

For NR V2X UE, the maximum input level is defined as the maximum mean power received at the UE antenna port, over the Transmission bandwidth configuration.

The throughput shall be ≥95% of the maximum throughput of the reference measurement channels with parameters specified in Table 18.

Table 18 shows an example of Maximum input level for NR V2X.

TABLE 18

| | | NR Channel Bandwidth | | | |
|---|---|---|---|---|---|
| Rx Parameter | Units | 10 MHz | 20 MHz | 30 MHz | 40 MHz |
| Power in largest transmission bandwidth configuration | dBm | −22/−25 | | | |

When the example of Maximum input level for NR V2X in Table 18 is used, a transmitter of NR V2X UE may be set to be use transmission power, which is set to 4 dB below PCMAX_L,f,c at the minimum uplink configuration (for example, as the example specified in Table 13). Here, PCMAX_L,f,c may be lower limit value for determining transmission power of the NR V2X UE. According to Table 18, −22 dBm may be used for 64 QAM (for example, when reference measurement channel based on 64QAM is used) and −25 dBm may be used for 256 QAM (for example, when reference measurement channel based on 256 QAM is used). When NR UE is configured for simultaneous NR V2X sidelink and NR downlink reception for inter-band concurrent NR V2X/NR bands (for example, as specified in Table 13), the requirements based on Table 18 may be applied for the NR V2X sidelink reception. When describing examples of reference sensitivity and/or maximum input level above, "reference measurement channel" was mentioned. Hereinafter, an example of a reference measurement channel will be described.

Reference measurement channel for receiver characteristics (e.g. reference sensitivity and/or maximum input level) will be described.

The following examples shown in Table 19 to Table 24 may be used as the Reference measurement channel for receiver characteristics for NR V2X. For example, for NR V2X side link transmission over PC5, Table 19 to Table 22 may be applicable for measurements on the Receiver Characteristics (e.g. reference sensitivity for NR V2X). for example, Table 23 and Table 24 may be applicable for Maximum input level.

For reference, the following description may be commonly applied to Tables 1 to 6 below. 2symbols are not considered due to AGC (Automatic Gain Control) setting time, Tx/Rx switched time, and/or 2 symbols, which are allocated for DM-RS. Throughput (in kbps) will depend on SA (Scheduling Assignment) period configuration. If more than one Code Block is present, an additional CRC(cyclic redundancy check) sequence of L=24 Bits is attached to each Code Block (otherwise L=0 Bit).

Table 19 shows an example of Fixed Reference measurement channel for NR V2X when 10 MHz Channel Bandwidth is used.

TABLE 19

| Parameter | Unit | 10 MHz Channel BW | | |
|---|---|---|---|---|
| SCS | kHz | 15 kHz | 30 kHz | 60 kHz |
| Allocated resource blocks | | 50 | 20 | 10 |
| Subcarriers per resource block | | 12 | 12 | 12 |
| Packets per period | | 1 | 1 | 1 |
| Modulation | | QPSK | QPSK | QPSK |
| Target Coding Rate | | ⅓ | ⅓ | ⅓ |
| Transport Block Size | | 3968 | 1544 | 768 |
| Transport block CRC | Bits | 24 | 24 | 24 |
| Number of Code Blocks per Sub-Frame | | 1 | 1 | 1 |
| Maximum number of HARQ transmissions | | 1 | 1 | 1 |
| Binary Channel Bits per subframe | Bits | 13064 | 5248 | 2600 |
| Max. Throughput averaged over 1 period of 100 ms | kbps | 39.68 | 15.44 | 7.68 |
| UE Category | | >1 | >1 | >1 |

Table 20 shows an example of Fixed Reference measurement channel for NR V2X when 20 MHz Channel Bandwidth is used.

TABLE 20

| Parameter | Unit | 20 MHz Channel BW | | |
|---|---|---|---|---|
| SCS | kHz | 15 kHz | 30 kHz | 60 kHz |
| Allocated resource blocks | | 105 | 50 | 20 |
| Subcarriers per resource block | | 12 | 12 | 12 |

TABLE 20-continued

| Parameter | Unit | 20 MHz Channel BW | | |
|---|---|---|---|---|
| SCS | kHz | 15 kHz | 30 kHz | 60 kHz |
| Packets per period | | 1 | 1 | 1 |
| Modulation | | QPSK | QPSK | QPSK |
| Target Coding Rate | | ⅓ | ⅓ | ⅓ |
| Transport Block Size | | 8192 | 3968 | 1544 |
| Transport block CRC | Bits | 24 | 24 | 24 |
| Number of Code Blocks per Sub-Frame | | 1 | 2 | 2 |
| Maximum number of HARQ transmissions | | 1 | 1 | 1 |
| Binary Channel Bits per subframe | Bits | 27656 | 13064 | 5248 |
| Max. Throughput averaged over 1 period of 100 ms | kbps | 81.92 | 39.68 | 15.44 |
| UE Category | | >1 | >1 | >1 |

Table 21 shows an example of Fixed Reference measurement channel for NR V2X when 30 MHz Channel Bandwidth is used.

TABLE 21

| Parameter | Unit | 30 MHz Channel BW | | |
|---|---|---|---|---|
| SCS | kHz | 15 kHz | 30 kHz | 60 kHz |
| Allocated resource blocks | | 160 | 75 | 30 |
| Subcarriers per resource block | | 12 | 12 | 12 |
| Packets per period | | 1 | 1 | 1 |
| Modulation | | QPSK | QPSK | QPSK |
| Target Coding Rate | | ⅓ | ⅓ | ⅓ |
| Transport Block Size | | 12808 | 5888 | 2280 |
| Transport block CRC | Bits | 24 | 24 | 24 |
| Number of Code Blocks per Sub-Frame | | 2 | 1 | 1 |
| Maximum number of HARQ transmissions | | 1 | 1 | 1 |
| Binary Channel Bits per subframe | Bits | 42016 | 19968 | 7936 |
| Max. Throughput averaged over 1 period of 100 ms | kbps | 128.08 | 58.88 | 22.80 |
| UE Category | | >1 | >1 | >1 |

Table 22 shows an example of Fixed Reference measurement channel for NR V2X when 40 MHz Channel Bandwidth is used.

TABLE 22

| Parameter | Unit | 40 MHz Channel BW | | |
|---|---|---|---|---|
| SCS | kHz | 15 kHz | 30 kHz | 60 kHz |
| Allocated resource blocks | | 210 | 105 | 50 |
| Subcarriers per resource block | | 12 | 12 | 12 |
| Packets per period | | 1 | 1 | 1 |
| Modulation | | QPSK | QPSK | QPSK |
| Target Coding Rate | | ⅓ | ⅓ | ⅓ |
| Transport Block Size | | 16896 | 8192 | 3968 |
| Transport block CRC | Bits | 24 | 24 | 24 |
| Number of Code Blocks per Sub-Frame | | 3 | 1 | 1 |
| Maximum number of HARQ transmissions | | 1 | 1 | 1 |
| Binary Channel Bits per subframe | Bits | 55304 | 27656 | 13064 |
| Max. Throughput averaged over 1 period of 100 ms | kbps | 168.96 | 81.92 | 39.68 |
| UE Category | | >1 | >1 | >1 |

Table 23 shows an example of Fixed Reference measurement channel for NR V2X maximum input level requirements for 64QAM.

TABLE 23

| Parameter | Unit | Value | | | |
|---|---|---|---|---|---|
| Channel bandwidth | MHz | 10 | 20 | 30 | 40 |
| Allocated resource blocks | | 50 | 105 | 160 | 210 |
| Subcarriers per resource block | | 12 | 12 | 12 | 12 |
| Packets per period | | 1 | 1 | 1 | 1 |
| Modulation | | 64 QAM | 64 QAM | 64 QAM | 64 QAM |
| Target Coding Rate | | ¾ | ¾ | ¾ | ¾ |
| Transport Block Size | | 27656 | 58384 | 88064 | 116792 |
| Transport block CRC | Bits | 24 | 24 | 24 | 24 |
| Number of Code Blocks per Sub-Frame | | 4 | 7 | 11 | 14 |
| Maximum number of HARQ transmissions | | 1 | 1 | 1 | 1 |
| Binary Channel Bits per subframe | Bits | 39936 | 83976 | 127080 | 167976 |
| Max. Throughput averaged over 1 period of 100 ms | kbps | 276.56 | 583.84 | 880.64 | 1167.92 |

Table 24 shows an example of Fixed Reference measurement channel for NR V2X maximum input level requirements for 256QAM.

TABLE 24

| Parameter Channel bandwidth | Unit | Value | | | |
|---|---|---|---|---|---|
| | MHz | 10 | 20 | 30 | 40 |
| Allocated resource blocks | | 50 | 105 | 160 | 210 |
| Subcarriers per resource block | | 12 | 12 | 12 | 12 |
| Packets per period | | 1 | 1 | 1 | 1 |
| Modulation | | 256 QAM | 256QAM | 256 QAM | 256 QAM |
| Target Coding Rate | | ⅚ | ⅚ | ⅚ | ⅚ |
| Transport Block Size | | 43032 | 90176 | 139376 | 180376 |
| Transport block CRC | Bits | 24 | 24 | 24 | 24 |
| Number of Code Blocks per Sub-Frame | | 6 | 11 | 17 | 22 |
| Maximum number of HARQ transmissions | | 1 | 1 | 1 | 1 |
| Binary Channel Bits per subframe | | 53288 | 110632 | 167976 | 221376 |
| Max. Throughput averaged over 1 period of 100 ms | kbps | 430.32 | 901.76 | 1393.76 | 1803.76 |

The RF requirements described above may be applied to the transceiver of the UE. For example, the reference sensitivity described above can be applied to the transceiver of the UE. For example, the maximum input level described above can be applied to the transceiver of the UE. Hereinafter, with reference to FIG. 12, an example of an operation of a UE (e.g., NR V2X UE) to which the RF requirements described through examples in this specification are applied will be described.

The following drawings are made to explain a specific example of the present specification. Since the names of specific devices or names of specific signals/messages/fields described in the drawings are provided by way of example, technical features of the present specification are not limited to specific names used in the following drawings.

Figure 12:
FIG. 12 is a flowchart illustrating an example of the operation of a UE according to an embodiment of the present specification.

FIG. 12 is a flowchart illustrating an example of the operation of a UE according to an embodiment of the present specification.

In step SA-601, The UE may receive sidelink signal from other UE. The UE may also transmit sidelink signal to other UE. The UE may be configured for NR V2X. The UE may perform V2X communication based on NR V2X band. The NR V2X band may include operating band n38 and operating band n47.

A transceiver of the UE may be configured to satisfy RF requirements. For example, reference sensitivity and/or maximum input level may be applied to the transceiver of the UE. For example, the reference sensitivity for NR V2X may be applied to the transceiver of the UE based on a combination of SCS and Channel bandwidth. According to the examples shown in Table 11, when operating band n38 is used for V2X communication, based on the combination of 60 kHz SCS and 10 MHz channel bandwidth, −96.9 dBm of reference sensitivity may be applied to the transceiver of the UE. According to the examples shown in Table 11, when operating band n47 is used for V2X communication, based on the combination of 60 kHz SCS and 10 MHz channel bandwidth, −92.9 dBm of reference sensitivity may be applied to the transceiver of the UE.

<Communication System to which the Disclosure of this Specification is to be Applied>

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 13:
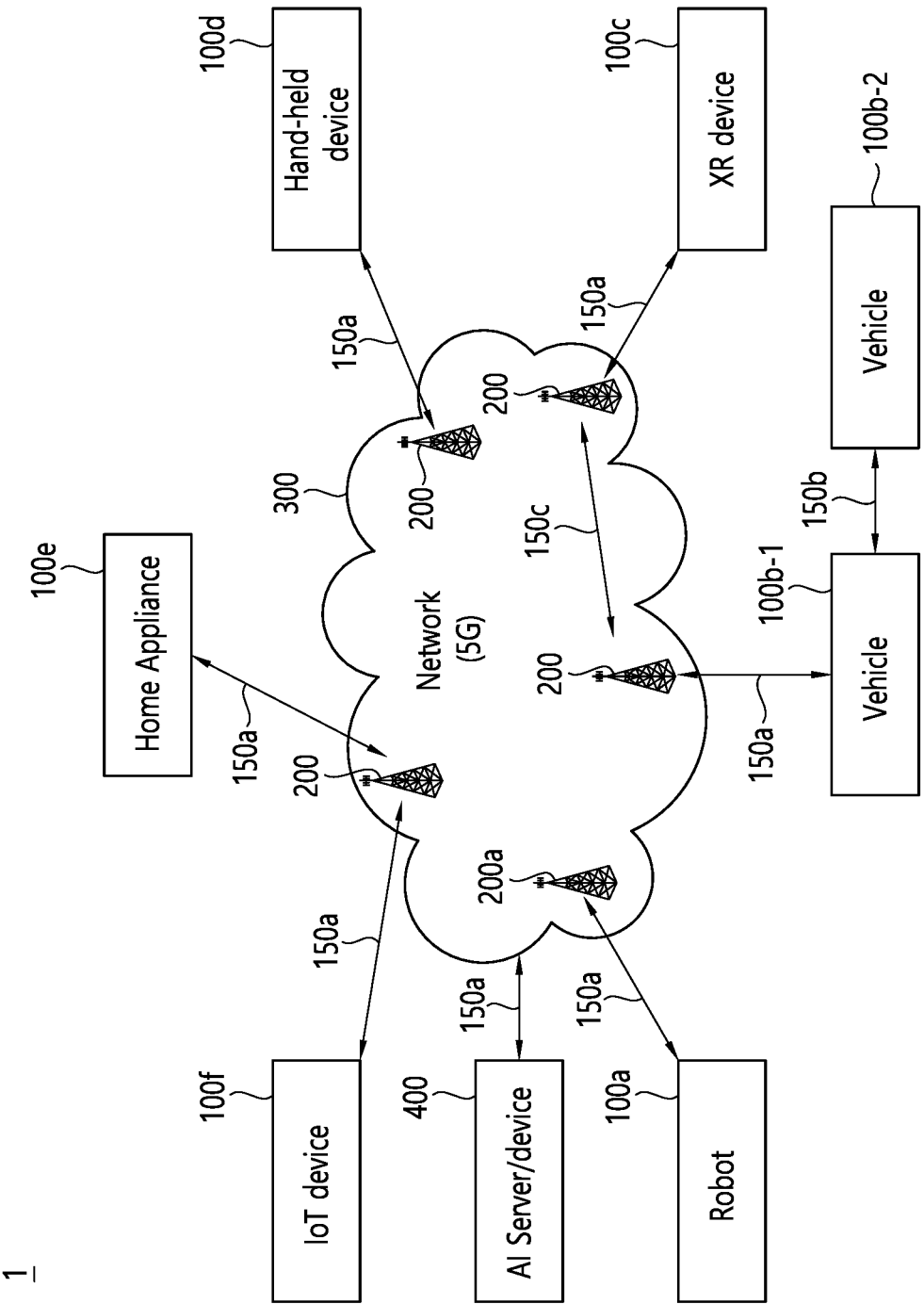
FIG. 13 illustrates a communication system 1 that can be applied to the present specification.

FIG. 13 illustrates a communication system 1 that can be applied to the present specification.

Referring to FIG. 13, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device.

Although not limited thereto, the wireless device may include a robot 100*a*, a vehicle 100*b*-1, 100*b*-2, an eXtended Reality (XR) device 100*c*, a hand-held device 100*d*, a home appliance 100*e*, an Internet of Thing (IoT) device 100*f*, and the AI device/server 400. For example, the vehicle may include a vehicle having a wireless communication function, an autonomous vehicle, a vehicle capable of performing inter-vehicle communication, and the like.

Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like.

The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200*a* may operate as a base station/network node to other wireless devices.

The wireless devices 100*a* to 100*f* may be connected to the network 300 through the base station 200. AI (Artificial Intelligence) technology may be applied to the wireless devices 100*a* to 100*f*, and the wireless devices 100*a* to 100*f* may be connected to the AI server 400 through the network 300.

The network 300 may be configured using a 3G network, a 4G (e.g. LTE) network, a 5G (e.g. NR) network, or the like. The wireless devices 100*a*-100*f* may communicate with each other via the base station 200/network 300, but may also communicate directly (e.g. sidelink communication) without passing through the base station/network. For example, the vehicles 100*b*-1 and 100*b*-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100*a* to 100*f*.

A wireless communication/connection 150*a*, 150*b*, 150*c* may be performed between the wireless devices 100*a*-100*f*/ base station 200 and base station 200/base station 200. Here, the wireless communication/connection is implemented based on various wireless connections (e.g., 5G NR) such as uplink/downlink communication 150*a*, sidelink communication 150*b* (or D2D communication), inter-base station communication 150*c* (e.g. relay, integrated access backhaul), and the like.

The wireless device and the base station/wireless device, the base station, and the base station may transmit/receive radio signals to each other through the wireless communication/connections 150*a*, 150*b*, and 150*c*. For example, wireless communications/connections 150*a*, 150*b*, 150*c* may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

Figure 14:
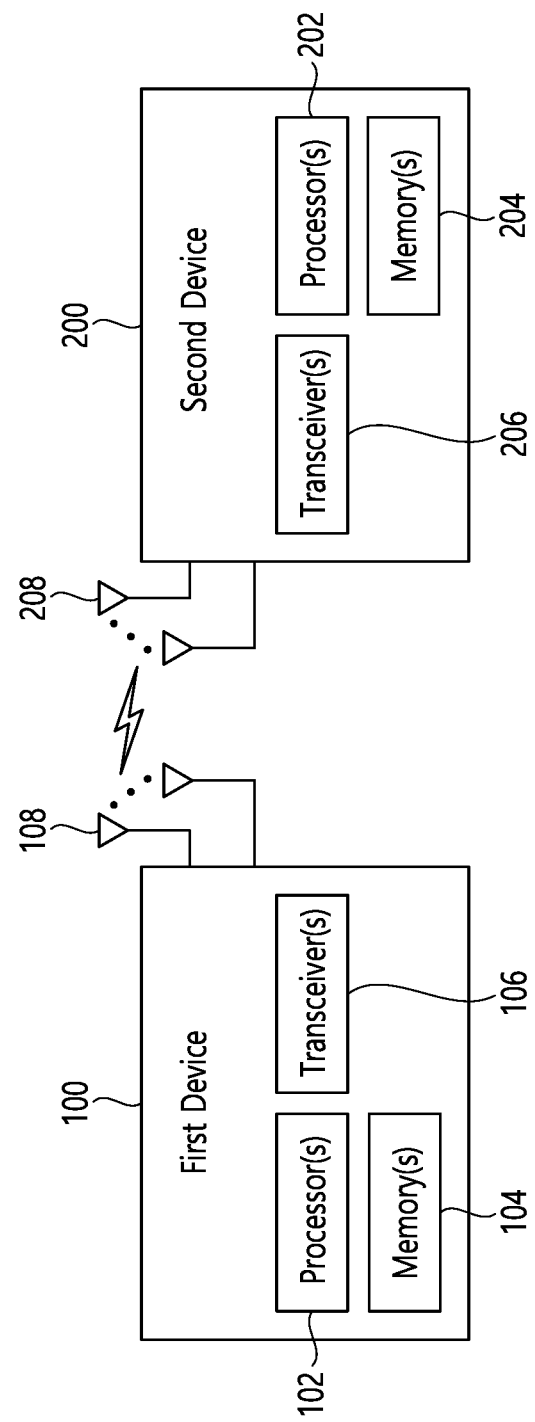
FIG. 14 illustrates an example of a wireless device that can be applied to the present specification.

FIG. 14 illustrates an example of a wireless device that can be applied to the present specification.

Referring to FIG. 14, the first wireless device 100 and the second wireless device 200 may transmit and receive wireless signals through various wireless access technologies (e.g., LTE and NR). Here, the {first wireless device 100 and the second wireless device 200} may refer to the {wireless device 100*x*, the base station 200} and/or the {wireless device 100*x*, the wireless device 100*x* of FIG. 13}. Here, x of 100*x* may be at least one of a, b-1, b-2, c, d, f and/or e.

The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein.

For example, the processor 102 may process the information in the memory 104 to generate a first information/signal, and then transmit the wireless signal including the first information/signal through the transceiver 106. In addition, the processor 102 may receive the radio signal including a second information/signal through the transceiver 106 and store the information obtained from the signal processing of the second information/signal in the memory 104.

The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein.

Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein.

For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204.

The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein.

Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto.

For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein.

One or more processors 102, 202 may generate messages, control information, data or information in accordance with the descriptions, functions, procedures, suggestions, methods and/or operational flowcharts disclosed herein.

One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206.

One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

One or more processors 102, 202 may be referred to as a controller, microcontroller, microprocessor, or microcomputer. One or more processors 102, 202 may be implemented by hardware, firmware, software, or a combination thereof.

For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102, 202.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals.

For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208.

In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 15:
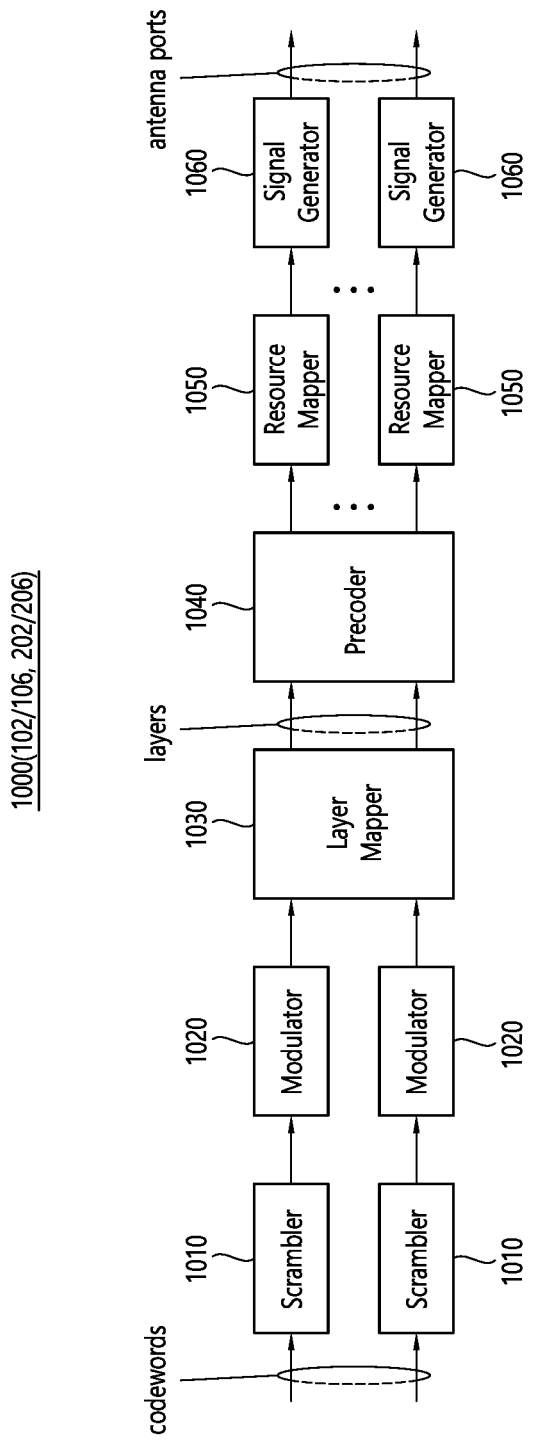
FIG. 15 illustrates an example of a signal processing circuit for a transmission signal that can be applied to the present specification.

FIG. 15 illustrates an example of a signal processing circuit for a transmission signal that can be applied to the present specification.

Referring to FIG. 15, the signal processing circuit 1000 may include a scrambler 1010, a modulator 1020, a layer mapper 1030, a precoder 1040, a resource mapper 1050, and a signal generator 1060.

Although not limited thereto, the operations/functions of FIG. 15 may be performed in the processor (102, 202), the memory (104, 204) and/or transceiver (106, 206) of FIG. 14.

The hardware element of FIG. 15 may be implemented in the processors 102 and 202 and/or the transceivers 106 and 206 of FIG. 14. For example, blocks 1010-1060 may be implemented in the processors 102, 202 of FIG. 14. Also, blocks 1010-1050 may be implemented in the processors 102 and 202 of FIG. 14, and block 1060 may be implemented in the transceivers 106 and 206 of FIG. 14.

The codeword may be converted into a wireless signal through the signal processing circuit 1000 of FIG. 15. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like.

The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010~1060 of FIG. 15. For example, a wireless device (e.g., 100 and 200 of FIG. 14) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a postcoder, a demodulator, a de-scrambler and a decoder.

Figure 16:
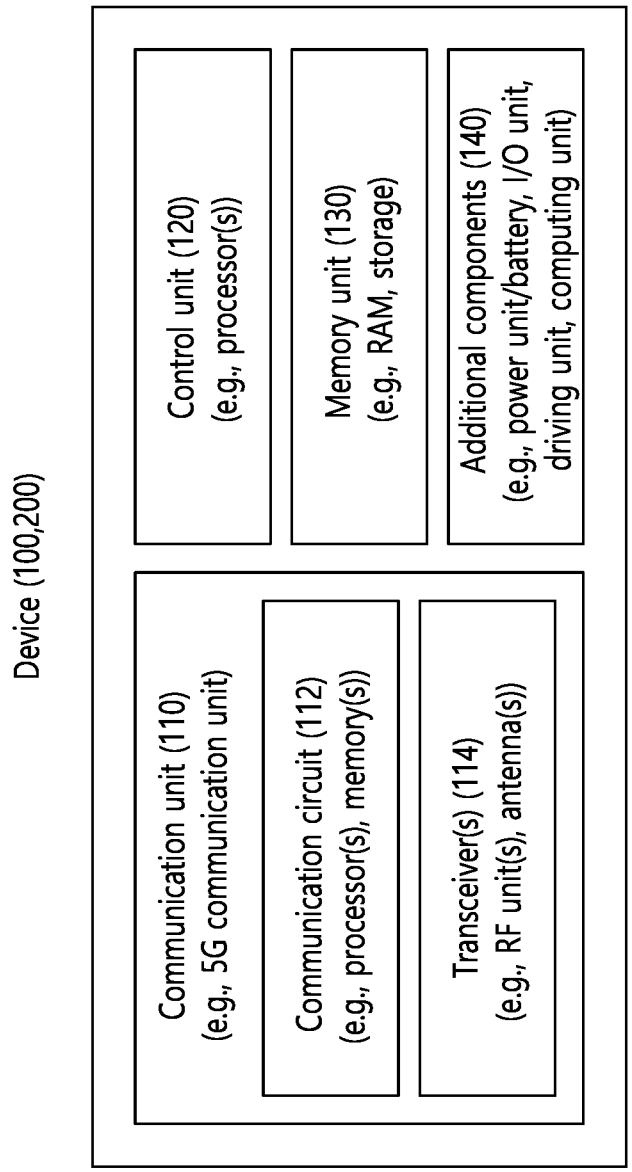
FIG. 16 illustrates another example of a wireless device that can be applied to the present specification.

FIG. 16 illustrates another example of a wireless device that can be applied to the present specification.

The wireless device may be implemented in various forms according to a use-example/service (see FIG. 13 and FIG. 16, FIG. 17, FIG. 18).

Referring to FIG. 16, the wireless devices 100 and 200 correspond to the wireless devices 100 and 200 of FIG. 14, and the wireless devices 100 and 200 may be configured with various elements, components, units, and/or modules.

For example, the wireless device 100, 200 may include a communication unit 110, a control unit 120, a memory unit 130, and additional components 140. The communication unit may include communication circuit 112 and transceiver (s) 114.

For example, the communication circuit 112 may include one or more processors 102, 202 and/or one or more memories 104, 204 of FIG. 14. For example, the transceiver (s) 114 may include one or more transceivers 106, 206 and/or one or more antennas 108, 208 of FIG. 14.

The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130.

In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 14. For example, the memory unit 130 may include one or more memories 104 and 204 of FIG. 14.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 13, 100*a*), a vehicle (FIG. 13, 100*b*-1, 100*b*-2), an XR device (FIG. 13, 100*c*), a portable device (FIG. 13, 100*d*), a home appliance. (FIG. 13, 100*e*), IoT devices (FIG. 13, 100*f*), terminals for digital broadcasting, hologram devices, public safety devices, MTC devices, medical devices, fintech devices (or financial devices), security devices, climate/environment devices, an AI server/device (FIG. 13, 400), a base station (FIG. 13, 200), a network node, and the like. The wireless device may be used in a mobile or fixed location depending on the usage-example/service.

In FIG. 16, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Hereinafter, the implementation example of FIG. 16 will be described in more detail with reference to the accompanying drawings.

Figure 17:
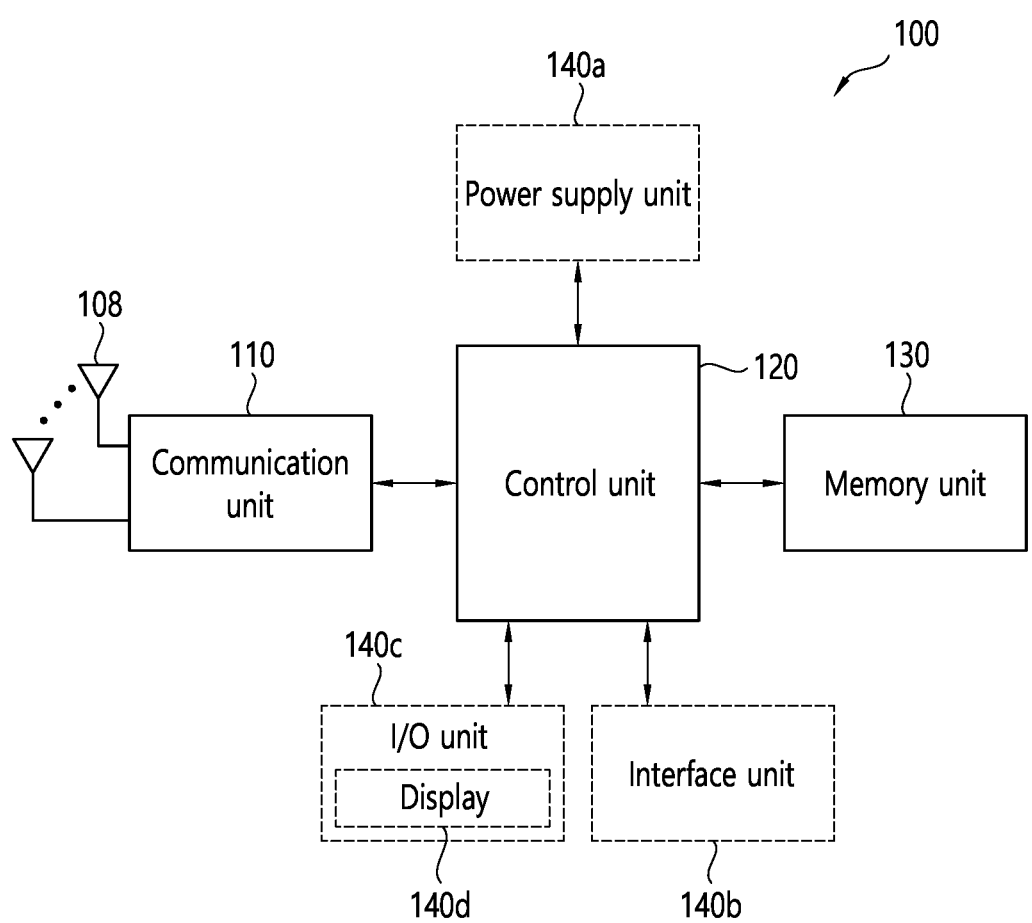
FIG. 17 illustrates an example of a mobile device that can be applied to the present specification.

FIG. 17 illustrates an example of a mobile device that can be applied to the present specification.

The mobile device may include a smart phone, a smart pad, a wearable device (e.g., smart watch, smart glasses), and a portable computer (e.g., a laptop, etc.). The mobile device may be referred to as a mobile station (MS), a user terminal (UT), a mobile subscriber station (MSS), a subscriber station (SS), an advanced mobile station (AMS), or a wireless terminal (WT).

Referring to FIG. 17, the portable device 100 includes an antenna unit 108, a communication unit 110, a control unit 120, a memory unit 130, a power supply unit 140*a*, an interface unit 140*b*, and an input/output unit 140*c*. The antenna unit 108 may be configured as part of the communication unit 110. Blocks 110 to 130/140*a* to 140*c* respectively correspond to blocks 110 to 130/140 of FIG. 16.

The communication unit 110 may transmit and receive signals (e.g., data, control signals, etc.) with other wireless devices and base stations. The control unit 120 may control various components of the portable device 100 to perform various operations. The control unit 120 may include an application processor (AP). The memory unit 130 may store data/parameters/programs/codes/commands necessary for driving the portable device 100. In addition, the memory unit 130 may store input/output data/information and the like.

The power supply unit 140*a* supplies power to the portable device 100 and may include a wired/wireless charging circuit, a battery, and the like. The interface unit 140*b* may support the connection of the mobile device 100 to another external device. The interface unit 140*b* may include various ports (e.g., audio input/output port and video input/output port) for connecting to an external device. The input/output unit 140*c* may receive or output image information/signal, audio information/signal, data, and/or information input from a user. The input/output unit 140*c* may include a camera, a microphone, a user input unit, a display unit 140*d*, a speaker, and/or a haptic module.

For example, in the case of data communication, the input/output unit 140*c* obtains information/signals (e.g., touch, text, voice, image, and video) input from a user, and the obtained information/signal may be stored in a memory unit 130. The communication unit 110 may convert the information/signal stored in the memory unit 130 into a wireless signal and directly transmit the converted wireless signal to another wireless device or to the base station. In addition, the communication unit 110 may receive a radio signal from another wireless device or a base station, and then restore the received radio signal to original information/signal. The restored information/signal may be stored in the memory unit 130 and then output in various forms (e.g., text, voice, image, video, and haptic) through the input/output unit 140*c*.

Figure 18:
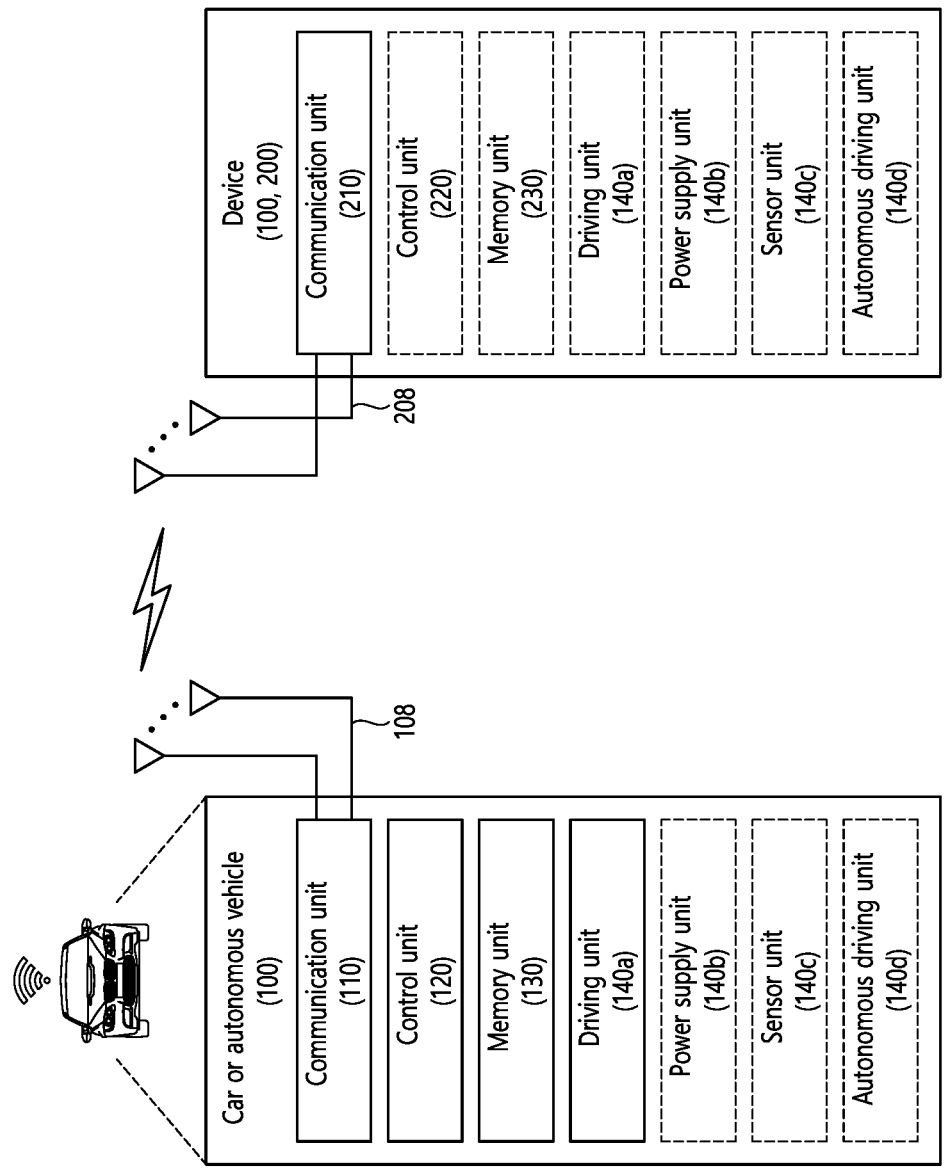
FIG. 18 illustrates an example of a vehicle or an autonomous vehicle that can be applied to the present specification.

FIG. 18 illustrates an example of a vehicle or an autonomous vehicle that can be applied to the present specification.

The vehicle or autonomous vehicle may be implemented as a mobile robot, a vehicle, a train, an aerial vehicle (AV), a ship, or the like.

Referring to FIG. 18, the vehicle or the autonomous vehicle 100 may include an antenna unit 108, a communication unit 110, a control unit 120, a driving unit 140*a*, a power supply unit 140*b*, a sensor unit 140*c*, and autonomous driving unit 140*d*.

The antenna unit 108 may be configured as part of the communication unit 110. The blocks 110/130/140*a* to 140*d* may correspond to blocks 110/130/140 of FIG. 16, respectively. The communication unit 110 may transmit or receive signals (e.g., data, control signals, etc.) with external devices, such as base stations (e.g. base stations, road side units, etc.), servers, and the like.

The control unit 120 may control various elements of the vehicle or the autonomous vehicle 100 to perform various operations. The control unit 120 may include an ECU (Electronic Control Unit). The driving unit 140*a* may cause the vehicle or the autonomous vehicle 100 to drive on the ground. The driving unit 140*a* may include an engine, a motor, a power train, wheels, a brake, a steering device, and the like. The power supply unit 140*b* supplies power to the vehicle or the autonomous vehicle 100, and may include a wired/wireless charging circuit, a battery, and the like.

The sensor unit 140*c* may obtain vehicle status, surrounding environment information, user information, and the like. The sensor unit 140*c* includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140*d* may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140*d* may generate an autonomous driving route and a driving plan based on the obtained data. The control unit 120 may control the driving unit 140*a* to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles.

In addition, during autonomous driving, the sensor unit 140*c* may acquire vehicle state and surrounding environment information. The autonomous driving unit 140*d* may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A device comprising:
   at least one transceiver;
   at least one processor; and
   at least one computer memory operably coupled to the at least one processor and the at least one transceiver,
   wherein the at least one processor is configured to control the at least one transceiver to:
   receive a sidelink signal based on a New Radio (NR) operating band n38 or a NR operating band n47, and
   wherein reference sensitivity, which is based on the NR operating band n38 or the NR operating band n47, is applied to the at least one transceiver, and
   wherein the reference sensitivity is applied, based on a combination of subcarrier spacing and channel bandwidth.

2. The device of claim 1, wherein the reference sensitivity based on the NR operating band n38 is equal to −96.9 dBm, based on 60 kHz of subcarrier spacing and 10 MHz of channel bandwidth.

3. The device of claim 1, wherein the reference sensitivity based on the NR operating band n47 is equal to −92.9 dBm, based on 60 kHz of subcarrier spacing and 10 MHz of channel bandwidth.

4. The device of claim 1, wherein the reference sensitivity based on the NR operating band n38 is equal to:
   −96.9 dBm, based on 60 kHz of subcarrier spacing and 10 MHz of channel bandwidth;
   −96.1 dBm, based on 30 kHz of subcarrier spacing and 10 MHz of channel bandwidth; and
   −96.5 dBm, based on 15 kHz of subcarrier spacing and 10 MHz of channel bandwidth.

5. The device of claim 1, wherein the reference sensitivity based on the NR operating band n47 is equal to:
   −92.9 dBm, based on 60 kHz of subcarrier spacing and 10 MHz of channel bandwidth;
   −92.1 dBm, based on 30 kHz of subcarrier spacing and 10 MHz of channel bandwidth; and
   −92.5 dBm, based on 15 kHz of subcarrier spacing and 10 MHz of channel bandwidth.

6. A method comprising:
   receiving a sidelink signal based on a New Radio (NR) operating band n38 or a NR operating band n47,
   wherein reference sensitivity, which is based on the NR operating band n38 or the NR operating band n47, is applied to a transceiver of a user equipment (UE), and
   wherein the reference sensitivity is applied, based on a combination of subcarrier spacing and channel bandwidth.

7. The method of claim 6, wherein the reference sensitivity based on the NR operating band n38 is equal to −96.9 dBm, based on 60 kHz of subcarrier spacing and 10 MHz of channel bandwidth.

8. The method of claim 6, wherein the reference sensitivity based on the NR operating band n47 is equal to −92.9 dBm, based on 60 kHz of subcarrier spacing and 10 MHz of channel bandwidth.

9. The method of claim 6, wherein the reference sensitivity based on the NR operating band n38 is equal to:
   −96.9 dBm, based on 60 kHz of subcarrier spacing and 10 MHz of channel bandwidth;
   −96.1 dBm, based on 30 kHz of subcarrier spacing and 10 MHz of channel bandwidth; and
   −96.5 dBm, based on 15 kHz of subcarrier spacing and 10 MHz of channel bandwidth.

10. The method of claim 6, wherein the reference sensitivity based on the NR operating band n47 is equal to:
    −92.9 dBm, based on 60 kHz of subcarrier spacing and 10 MHz of channel bandwidth;
    −92.1 dBm, based on 30 kHz of subcarrier spacing and 10 MHz of channel bandwidth; and
    −92.5 dBm, based on 15 kHz of subcarrier spacing and 10 MHz of channel bandwidth.

11. An apparatus comprising:
    at least one processor; and
    at least one memory that stores instructions and is operably electrically connectable to the at least one processor,
    wherein operations performed based on the instructions being executed by the at least one processor include:

receiving, a sidelink signal based on a New Radio (NR) operating band n38 or a NR operating band n47, and wherein sensitivity, which is based on the NR operating band n38 or the NR operating band n47, is applied to at least one transceiver, and wherein the reference sensitivity is applied, based on a combination of subcarrier spacing and channel bandwidth.

* * * * *